United States Patent
Suzuki

(10) Patent No.: US 9,244,864 B2
(45) Date of Patent: Jan. 26, 2016

(54) INFORMATION PROVIDING SYSTEM, INFORMATION PROCESSING APPARATUS, COMPUTER READABLE MEDIUM, AND INFORMATION PROVIDING METHOD FOR PROVIDING ENCRYPTED INFORMATION

(71) Applicant: FUJI XEROX CO., LTD., Minato-ku, Tokyo (JP)

(72) Inventor: Koji Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 65 days.

(21) Appl. No.: 14/057,234

(22) Filed: Oct. 18, 2013

(65) Prior Publication Data

US 2014/0281576 A1    Sep. 18, 2014

(30) Foreign Application Priority Data

Mar. 12, 2013    (JP) .................................. 2013-048684

(51) Int. Cl.
| | |
|---|---|
| *H04L 9/08* | (2006.01) |
| *G06F 12/14* | (2006.01) |
| *G06F 21/00* | (2013.01) |

(52) U.S. Cl.
CPC ............ *G06F 12/1408* (2013.01); *G06F 21/00* (2013.01); *H04L 9/0822* (2013.01); *H04L 9/0838* (2013.01); *H04L 9/0861* (2013.01)

(58) Field of Classification Search
None
See application file for complete search history.

(56) References Cited

U.S. PATENT DOCUMENTS

| 8,713,315 B2 * | 4/2014 | Suzuki .......................... 713/168 |
| 2004/0071293 A1 * | 4/2004 | Yamamichi et al. .......... 380/277 |

(Continued)

FOREIGN PATENT DOCUMENTS

| JP | 2001-275097 A | 10/2001 |
| JP | 2002-247021 A | 8/2002 |

(Continued)

OTHER PUBLICATIONS

Translation of Communication dated Aug. 11, 2015, issued by the Japan Patent Office in corresponding Japanese Application No. 2013-048684.

*Primary Examiner* — Minh Dinh
*Assistant Examiner* — Wayne An
(74) *Attorney, Agent, or Firm* — Sughrue Mion, PLLC

(57) ABSTRACT

An information providing system includes first and second apparatuses. The first apparatus includes a memory storing a shared random number $R_i$ and shared information, a providing unit providing the second apparatus with encrypted information $e(K_i, F_i)$ obtained by encrypting information $F_i$ with an encryption key and an encrypted key $Y_i$ obtained by encrypting a decryption key $K_i$ with the random number $R_i$, and an updating unit updating $R_i$ to $R_{i+1}$ based on the shared information. The second apparatus includes a memory storing the random number $R_i$ and the shared information, an acquiring unit acquiring the encrypted information $e(K_i, F_i)$ and the encrypted key $Y_i$, a key decrypting unit decrypting the encrypted key $Y_i$ with the random number $R_i$ to calculate the decryption key $K_i$ and updating $R_i$ to $R_{i+1}$ based on the shared information, and an information decrypting unit decrypting the encrypted information $e(K_i, F_i)$ with the decryption key $K_i$.

10 Claims, 9 Drawing Sheets

(56) References Cited

U.S. PATENT DOCUMENTS

2006/0072745 A1* 4/2006 Fukaya ............................ 380/28
2006/0120520 A1* 6/2006 Suzuki ................. G06F 21/602
                                                    380/28
2006/0280297 A1* 12/2006 Fukaya ............................ 380/28
2012/0191974 A1  7/2012 Suzuki

FOREIGN PATENT DOCUMENTS

| JP | 2003-110540 A | 4/2003 |
| JP | 2004-032307 A | 1/2004 |
| JP | 2007-174657 A | 7/2007 |
| JP | 2012-156809 A | 8/2012 |

\* cited by examiner

FIG. 3

| VIEW MANAGEMENT DATABASE |
|---|

MODULUS N

COUNTER i
(HOLDING NEXT
DOWNLOAD NUMBER i)

SHARED RANDOM NUMBER Ri
(VALUE TO BE USED
IN NEXT DOWNLOAD)

| DOWNLOAD NUMBER i | COUNTER $c_i$ (HOLDING TICKET NUMBER j) | ENCRYPTED CONFIDENTIAL FILE | FIRST KEY $X_{i,j}$ | TICKET STORAGE DIRECTORY |
|---|---|---|---|---|
| 1 | 5 | $e(K_1, F_1)$ | $X_{1,5}$ | $T_{1,5}$ |
| 2 | 2 | $e(K_2, F_2)$ | $X_{2,2}$ | — |
| 3 | 1 | $e(K_3, F_3)$ | $X_{3,1}$ | $T_{3,1}$ |
| ⋮ | ⋮ | ⋮ | ⋮ | ⋮ |

US 9,244,864 B2

INFORMATION PROVIDING SYSTEM, INFORMATION PROCESSING APPARATUS, COMPUTER READABLE MEDIUM, AND INFORMATION PROVIDING METHOD FOR PROVIDING ENCRYPTED INFORMATION

CROSS-REFERENCE TO RELATED APPLICATIONS

This application is based on and claims priority under 35 USC 119 from Japanese Patent Application No. 2013-048684 filed Mar. 12, 2013.

BACKGROUND (i) Technical Field

The present invention relates to an information providing system, an image processing apparatus, a computer readable medium, and an information providing method.

(ii) Related Art

When a confidential file on an information management apparatus such as a server is used on a terminal such as a smartphone, there is a concern of leakage of the confidential file due to, for example, theft of the terminal. As a measure addressing this concern, a mechanism is known which encrypts the confidential file to be downloaded to the terminal from the information management apparatus, and holds the encrypted confidential file in the terminal. To view the encrypted confidential file on the terminal, decryption information called ticket, for example, is acquired from the information management apparatus, and the encrypted confidential file is decrypted with the decryption information.

Further, the generation of an encryption key for encrypting the confidential file by the use of a random number has been performed in the past.

SUMMARY

According to an aspect of the invention, there is provided an information providing system including a first apparatus and a second apparatus. The first apparatus includes (A) a first memory, (B) a providing unit, and (C) a shared random number updating unit. The first memory stores an i-th (i represents an integer of 1 or greater) shared random number $R_i$ and shared information for updating the shared random number $R_i$ to an (i+1)-th shared random number $R_{i+1}$, which are shared by the first apparatus and the second apparatus. The providing unit provides encrypted information $e(K_i, F_i)$ and an encrypted key $Y_i$ to the second apparatus. The encrypted information $e(K_i, F_i)$ is obtained by encrypting provision target information $F_i$, which is to be provided in the i-th place to the second apparatus from the first apparatus, with an encryption key corresponding to the provision target information $F_i$. The encrypted key $Y_i$ is obtained by encrypting a decryption key $K_i$ corresponding to the encryption key with the shared random number $R_i$. The shared random number updating unit updates the shared random number $R_i$ stored in the first memory to the (i+1)-th shared random number $R_{i+1}$ in accordance with the shared information after the encrypted key $Y_i$ is obtained by encrypting the decryption key $K_i$ with the shared random number $R_i$, to thereby generate the (i+1)-th shared random number $R_{i+1}$. The second apparatus includes (a) a second memory, (b) an encrypted information acquiring unit, (c) an encrypted key decrypting unit, and (d) an information decrypting unit. The second memory stores the shared random number $R_i$ and the shared information. The encrypted information acquiring unit acquires the encrypted information $e(K_i, F_i)$ and the encrypted key $Y_i$ corresponding to the i-th provision target information $F_i$, which are provided from the first apparatus. The encrypted key decrypting unit decrypts the encrypted key $Y_i$ acquired by the encrypted information acquiring unit with the shared random number $R_i$ to thereby calculate the decryption key $K_i$, and updates the shared random number $R_i$ stored in the second memory to the (i+1)-th shared random number $R_{i+1}$ in accordance with the shared information after the use of the shared random number $R_i$ to calculate the decryption key $K_i$, to thereby generate the (i+1)-th shared random number $R_{i+1}$. The information decrypting unit decrypts the encrypted information $e(K_i, F_i)$ into the provision target information $F_i$ with the calculated decryption key $K_i$.

BRIEF DESCRIPTION OF THE DRAWINGS

An exemplary embodiment of the present invention will be described in detail based on the following figures, wherein:

FIG. 3 is a diagram illustrating an example of data content of a view management database included in a terminal apparatus;

DETAILED DESCRIPTION

Description of Signs

Figure 1:
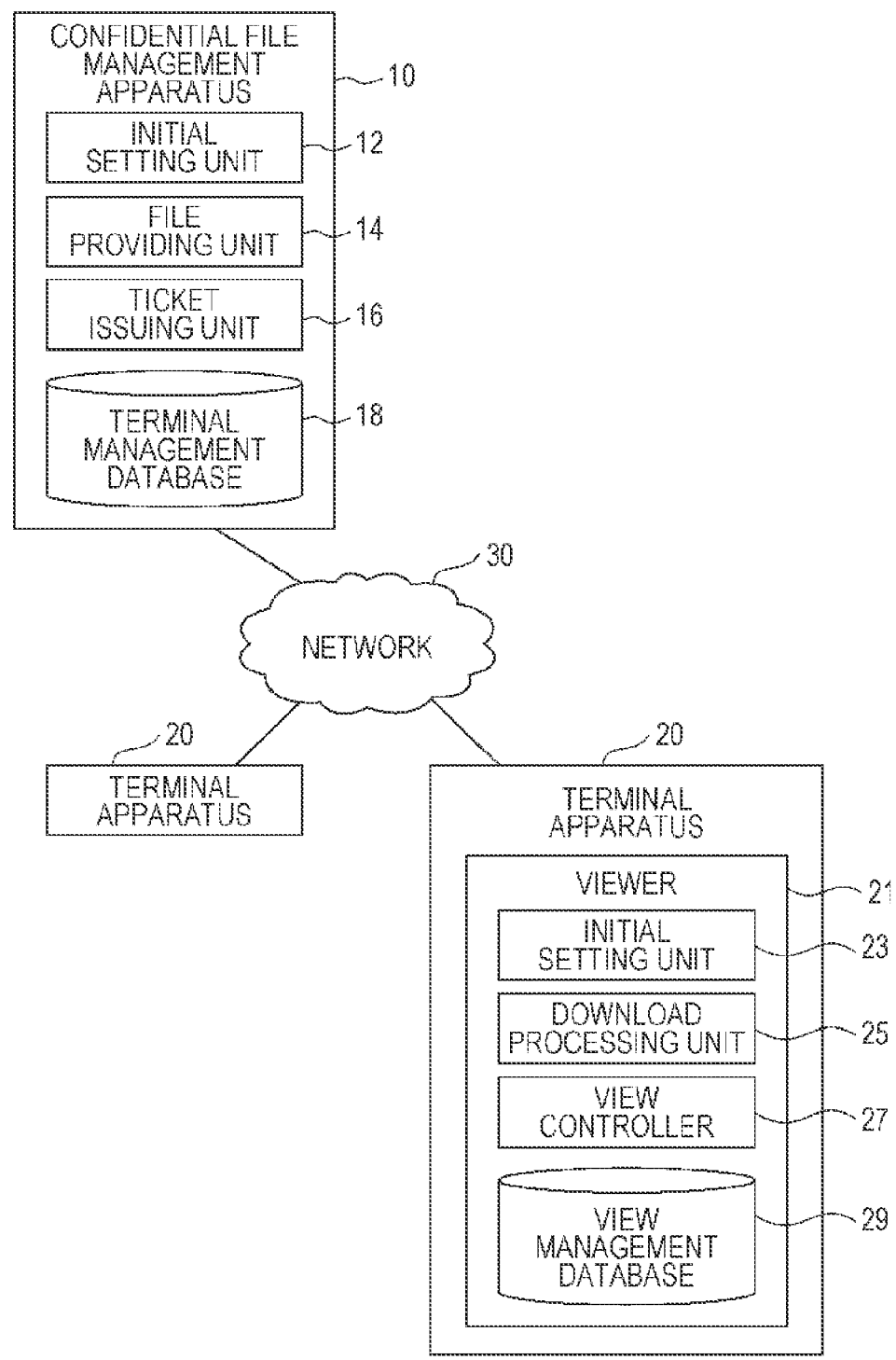
FIG. 1 is a diagram illustrating an example of a system configuration of the exemplary embodiment.

For reference, a brief description will be given below of various signs used in the following description.

i: Download number representing the serial number of a confidential file downloaded from a confidential file management apparatus 10 (hereinafter abbreviated as the "management apparatus 10") by a terminal apparatus 20. The download number i is an integer of 1 or greater, and functions as the identification number of the confidential file in the terminal apparatus 20.

j: Ticket number representing the serial number of an electronic ticket acquired for the same confidential file from the management apparatus 10 by the terminal apparatus 20. The ticket number j is an integer of 1 or greater.

$F_i$: Confidential file downloaded in the i-th place from the management apparatus 10 by the terminal apparatus 20.

$K_i$: Common key for encrypting the i-th confidential file $F_i$.

N: Modulus of a public key cryptosystem assigned to the terminal apparatus 20.

$r_{i,j}$: Encryption key used in encryption of the common key $K_i$ with the public key cryptosystem (later-described "first encryption").

$X_{i,j}$: Key subjected to the first encryption obtained by encrypting the common key $K_i$ with the encryption key $r_{i,j}$ (referred to as the "first key"). The first key $X_{i,j}$ corresponds to an electronic ticket $T_{i,j}$, and is updated every time an electronic ticket is discarded from the terminal apparatus 20.

$d_{i,j}$: Decryption key used to decrypt the first key $X_{i,j}$ with the public key cryptosystem. A pair of the decryption key $d_{i,j}$ and the encryption key $r_{i,j}$ is a key pair of the public key cryptosystem. The decryption key $d_{i,j}$ is included in the j-th electronic ticket $T_{i,j}$ for the confidential file F provided to the terminal apparatus 20 by the management apparatus 10.

$T_{i,j}$: The j-th electronic ticket for the confidential file $F_i$ provided to the terminal apparatus 20 by the management apparatus 10. The electronic ticket $T_{i,j}$ includes the decryption key $d_{i,j}$ for decrypting the first key $X_{i,j}$ in the terminal apparatus 20 and an encryption key $r_{i,j+1}$ for re-encrypting a common key resulting from the decryption. The original first key $X_{i,j}$ in the terminal apparatus 20 is replaced by a new first key $X_{i,j+1}$ generated by the re-encryption (update of the first key $X_{i,j}$).

$R_i$: Shared random number shared by the management apparatus 10 and the terminal apparatus 20. The shared random number $R_i$ is used for encryption of the initial first key $X_{i,1}$ for the confidential file $F_i$ (later-described "second encryption").

$Y_i$: Key subjected to the second encryption obtained by encrypting the initial first key $X_{i,1}$ for the confidential file $F_i$ with the shared random number $R_i$ (referred to as the "second key"). The key distributed to the terminal apparatus 20 from the management apparatus 10 takes the form of the second key Y.

HF: One-way function used to update the shared random number $R_i$. Since the management apparatus 10 and the terminal apparatus 20 share the same one-way function HF, the management apparatus 10 and the terminal apparatus 20 share the same value of the updated shared random number $R_{i+1}$.

Overview of System

As illustrated in FIG. 1, the present exemplary embodiment provides a system allowing a confidential file held by the confidential file management apparatus 10 (hereinafter abbreviated as the "management apparatus 10") to be used by the terminal apparatus 20 such as a smartphone or a personal computer, while maintaining confidentiality. In this system, the confidential file is protected by being encrypted with a common key common to the management apparatus 10 and the terminal apparatus 20, and the common key is doubly encrypted. Accordingly, the confidential file is protected both during the storage thereof in the terminal apparatus 20 (protection by single encryption) and during the distribution of the key to the terminal apparatus 20 from the management apparatus 10 (protection by double encryption).

Figure 2:
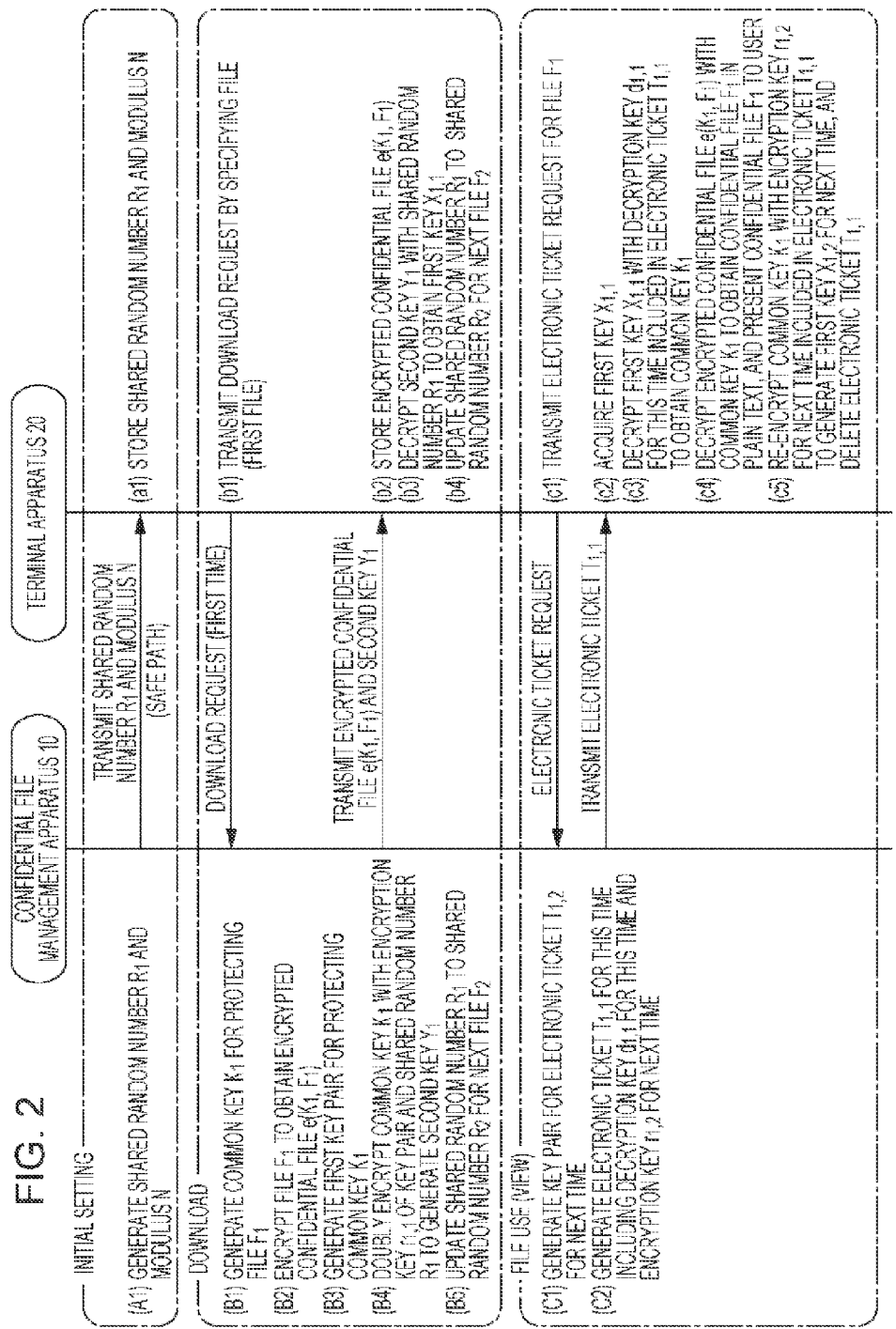
FIG. 2 is a diagram for describing a flow of processing in a system of the exemplary embodiment.

As illustrated in FIG. 2, the flow of processing in this system is roughly divided into three steps, i.e., initial setting, download of the confidential file, and use of the confidential file on the terminal apparatus 20 (acquisition of an electronic ticket).

As illustrated in FIG. 1, the management apparatus 10 includes, as functional modules in charge of the process of the above-described steps, an initial setting unit 12 (initial setting step), a file providing unit 14 (download step), and a ticket issuing unit 16 (file use step). The management apparatus 10 further includes a terminal management database 18 that holds management information for the process of these steps.

The terminal apparatus 20 includes a viewer 21, which is a program for using (viewing, for example) the confidential file. The viewer 21 includes an initial setting unit 23 (initial setting step), a download processing unit 25 (download step), and a view controller 27 (file use step) in charge of the above-described three steps, respectively. The terminal apparatus 20 further includes a view management database 29 that holds management information for the process of these steps.

The management apparatus 10 and the terminal apparatus 20 are communicable with each other via a network 30 for data communication, such as the Internet.

With reference to FIG. 2, the respective steps of the processing in the system will be described below.

(A) Initial Setting

"Initial setting" is a setting process performed to allow the terminal apparatus 20 to receive a service of providing a group of confidential files from the management apparatus 10. The "initial setting" may be performed once for each terminal apparatus 20. The following process is performed at the "initial setting" step.

(A1) At the "initial setting" step, the initial setting unit 12 of the management apparatus 10 first generates an initial value $R_1$ of a shared random number $R_i$ and a modulus N used in the Rivest-Shamir-Adleman (RSA) cryptosystem. The initial value $R_1$ and the modulus N are values unique to the individual terminal apparatus 20. The modulus N is used for single encryption (hereinafter referred to as the "first encryption") of a common key for protecting a confidential file. The initial value $R_1$ is used for double encryption (hereinafter referred to as the "second encryption") of the common key. The initial setting unit 12 stores the generated initial value $R_1$ and modulus N in the terminal management database 18 in association with identification information of the terminal apparatus 20 as the target of the initial setting.

Then, the initial setting unit 12 provides the initial value $R_1$ and the modulus N to the terminal apparatus 20 through a safe path.

(a1) The initial value $R_1$ and the modulus N provided by the management apparatus 10 are stored in the view management database 29 by the initial setting unit 23 of the terminal apparatus 20.

With the above-described process, the initial value $R_1$ of the shared random number $R_i$ and the modulus N are shared by the management apparatus 10 and the terminal apparatus 20. Thereby, the protection system of the present exemplary embodiment is made available.

(B) Download of Confidential File

To use a confidential file stored in the management apparatus 10, the terminal apparatus 20 downloads the confidential file in an encrypted form (hereinafter referred to as the "encrypted confidential file") from the management apparatus 10, and stores the encrypted confidential file. Then, in each of subsequent viewing sessions of the confidential file, the encrypted confidential file stored in the terminal apparatus 20 is decrypted and displayed. Basically, one confidential file is downloaded only once to the terminal apparatus 20 (to use again the encrypted confidential file deleted from the terminal apparatus 20, however, the encrypted confidential file is downloaded again). The "download" is performed every time a user uses a new confidential file.

In the present specification, the confidential file downloaded to the terminal apparatus 20 is identified by an ordinal number i. The ordinal number i is the value representing the number of downloads performed by the terminal apparatus 20, and will also be referred to as the "download number" in the following. The initial value of the download number i (the value corresponding to the download of the first file) is 1, which is thereafter incremented by one for each download of a new confidential file. The confidential file downloaded in the i-th place to the terminal apparatus 20 will be described as the "confidential file $F_i$."

The shared random number $R_i$ used for the second encryption is updated in both the management apparatus 10 and the terminal apparatus 20 in accordance with an updating method common thereto every time the confidential file $F_i$ is downloaded to the terminal apparatus 20. The shared random number $R_i$ is applied to the confidential file $F_i$, and a shared random number $R_{i+1}$ as the update result of the shared random number $R_i$ is applied to a confidential file $F_{i+1}$ downloaded next to the confidential file $F_i$.

In the "download" step illustrated in FIG. 2, a flow of processing is illustrated which is performed when the terminal apparatus 20 downloads a first confidential file $F_1$ after the initial setting. The flow will be described below.

(b1) The download processing unit 25 of the terminal apparatus 20 transmits to the management apparatus 10 a download request requesting a confidential file specified by the user.

(B1) The file providing unit 14 of the management apparatus 10 generates a common key $K_1$ to be used in the encryption of the first confidential file $F_1$ requested by the terminal apparatus 20. The common key $K_1$ is unique to the confidential file $F_1$. That is, when another confidential file $F_i$ is provided to the terminal apparatus 20, another common key $K_i$ is prepared for the confidential file $F_i$.

(B2) The file providing unit 14 encrypts the confidential file $F_1$ with the common key $K_1$. As a result of the encryption, an encrypted confidential file $e(K_1, F_1)$ is obtained.

(B3) For the protection (first encryption) of the common key $K_1$ according to the public key cryptosystem, the management apparatus 10 generates a first key pair $(r_{1,1}, d_{1,1})$ including an encryption key $r_{1,1}$ and a decryption key $d_{1,1}$ by using the modulus N corresponding to the terminal apparatus 20 stored in the terminal management database 18. The key pair $(r_{1,1}, d_{1,1})$ corresponds to the first electronic ticket for the confidential file $F_1$. The decryption key $d_{1,1}$ of the generated key pair $(r_{1,1}, d_{1,1})$ is registered in the terminal management database 18 in association with the identification information of the terminal apparatus 20 in preparation for later use.

Herein, the key pair $(r_{i,j}, d_{i,j})$ corresponds to the j-th electronic ticket $T_{i,j}$ issued for the confidential file $F_i$. As described later, the decryption key $d_{i,j}$ of the key pair $r_{i,j}, d_{i,j})$ is incorporated in the electronic ticket $T_{i,j}$. As understood from this mechanism, the key pair $(r_{i,j}, d_{i,j})$ is unique to the confidential file $F_i$ and also unique to the electronic ticket $T_{i,j}$ for the confidential file $F_i$.

(B4) The file providing unit 14 doubly encrypts the common key $K_1$ with the encryption key $r_{1,1}$ of the first key pair $(r_{1,1}, d_{1,1})$ and the shared random number $R_1$.

More specifically, the file providing unit 14 first performs the encryption ("first encryption") of the common key $K_1$ in accordance with the public key cryptosystem using the encryption key $r_{1,1}$, to thereby generate a common key subjected to the first encryption (hereinafter referred to as the "first key") $X_1$. As described later, the first key $X_1$ is updated in the terminal apparatus 20 upon, for example, each use of the confidential file $F_1$. In this process, therefore, the management apparatus 10 generates an initial value $X_{1,1}$ of the first key $X_1$.

Then, the management apparatus 10 performs the encryption ("second encryption") of the initial value $X_{1,1}$ of the first key $X_1$ by using the shared random number $R_1$ for the confidential file $F_1$, to thereby generate a common key subjected to the second encryption (hereinafter referred to as the "second key") $Y_1$.

The management apparatus 10 then transmits the encrypted confidential file $e(K_1, F_1)$ and the second key $Y_1$ to the terminal apparatus 20. The transmission path used for this transmission is not required to be a safe path.

(B5) After the generation of the second key $Y_1$, the file providing unit 14 of the management apparatus 10 updates the shared random number $R_1$ corresponding to the terminal apparatus 20 stored in the terminal management database 18 to a shared random number $R_2$. The update is performed by the updating method common to the management apparatus 10 and the terminal apparatus 20. Thereby, the management apparatus 10 and the terminal apparatus 20 share the same shared random number $R_2$ after the update. The shared random number $R_2$ is used for a confidential file $F_2$ secondly downloaded by the terminal apparatus 20.

(b2) In the terminal apparatus 20 having received the encrypted confidential file $e(K_1, F_1)$ and the second key $Y_1$ from the management apparatus 10, the download processing unit 25 stores the encrypted confidential file $e(K_1, F_1)$ in the view management database 29.

(b3) The download processing unit 25 decrypts the received second key $Y_1$ (releases the "second encryption") with the shared random number $R_1$ held in the view management database 29, to thereby obtain the first key $X_{1,1}$. The download processing unit 25 then stores the obtained first key $X_{1,1}$ in the view management database 29.

(b4) After the decryption of the second key $Y_1$, the download processing unit 25 updates the shared random number $R_1$ stored in the view management database 29 to the shared random number $R_2$ for the next download by using the updating method common to the management apparatus 10 and the terminal apparatus 20. After the update, the download processing unit 25 deletes the shared random number $R_1$ held in the view management database 29 so far. In the terminal apparatus 20, therefore, only the latest shared random number (i.e., the shared random number to be used in the next download) is constantly present.

The above description has been given of the flow of processing following the initial setting, in which the first confidential file $F_1$ is downloaded to the terminal apparatus 20. Similar processing is also performed in the download of the second or subsequent confidential file.

(C) Use of Confidential File

To use (view or edit, for example) the downloaded confidential file on the terminal apparatus 20, the electronic ticket is acquired from the management apparatus 10. The electronic ticket includes the decryption key for decrypting the first key obtained from the second key acquired by the terminal apparatus 20 during the download of the confidential file. The terminal apparatus 20 decrypts the first key with the decryption key to regenerate the common key. Then, the terminal apparatus 20 decrypts the encrypted confidential file acquired at the download step by using the common key, to thereby obtain the confidential file in plain text.

In one example, every time the terminal apparatus 20 uses a confidential file, the terminal apparatus 20 acquires an electronic ticket corresponding to the confidential file from the management apparatus 10. In this case, if the confidential file opened with the electronic ticket is closed, the electronic ticket is invalidated. To open the same confidential file next time, therefore, a new electronic ticket corresponding to the confidential file is acquired from the management apparatus 10.

In the "file use" step illustrated in FIG. 2, a flow of processing is illustrated which is performed when the terminal apparatus 20 first uses the first confidential file $F_1$ downloaded thereto. The flow will be described below.

(c1) The view controller 27 of the terminal apparatus 20 requests the management apparatus 10 to transmit an electronic ticket for the confidential file specified by the user (it is assumed herein that the confidential file $F_1$ has been specified). In this case, the request transmitted to the management apparatus 10 by the view controller 27 includes a download number i of 1 identifying the target confidential file $F_1$ and a ticket number j representing the ordinal number of the electronic ticket corresponding to the confidential file $F_1$ (in this case, the ticket number j is "1" corresponding to the first electronic ticket request).

In the management apparatus 10 having received the electronic ticket request, the ticket issuing unit 16 performs a process for issuing an electronic ticket $T_{1,1}$ in response to the request. The process is as follows.

(C1) The ticket issuing unit 16 generates a key pair ($r_{1,2}$, $d_{1,2}$) corresponding to an electronic ticket $T_{1,2}$ for the next time to be transmitted to the terminal apparatus 20 for the confidential file $F_1$. The decryption key $d_{1,2}$ of the generated key pair ($r_{1,2}$, $d_{1,2}$) is stored in the terminal management database 18 in association with the identification information of the terminal apparatus 20 in preparation for later use.

(C2) The ticket issuing unit 16 then generates the electronic ticket $T_{1,1}$ for this time, which includes the decryption key $d_{1,1}$ of the key pair ($r_{1,1}$, $d_{1,1}$) for this time and the encryption key $r_{1,2}$ of the key pair ($r_{1,2}$, $d_{1,2}$) for the next time. Then, the ticket issuing unit 16 transmits the generated electronic ticket $T_{1,1}$ to the terminal apparatus 20.

(c2) In the terminal apparatus 20 having received the electronic ticket $T_{1,1}$, the view controller 27 stores the received electronic ticket $T_{1,1}$ in the view management database 29. Further, the view controller 27 acquires from the view management database 29 the first key $X_{1,1}$ corresponding to the confidential file $F_1$ specified as the view target.

(c3) Then, the view controller 27 decrypts the first key $X_{1,1}$ with the decryption key $d_{1,1}$ included in the received electronic ticket $T_{1,1}$, to thereby obtain the common key $K_1$.

(c4) Thereafter, the view controller 27 decrypts the encrypted confidential file $e(K_1, F_1)$ with the common key $K_1$, to thereby obtain the confidential file $F_1$ in plain text. The view controller 27 then displays the confidential file $F_1$ on a screen, for example, to be used by the user.

(c5) After the decryption and subsequent use of the confidential file $F_1$, for example (upon execution of an operation of closing the confidential file $F_1$, for example), the view controller 27 re-encrypts the common key $K_1$ with the encryption key $r_{1,2}$ for the next time included in the electronic ticket $T_{1,1}$ to thereby generate a first key $X_{1,2}$ for the next time, and stores the generated first key $X_{1,2}$ in the view management database 29. Then, the view controller 27 deletes the common key $K_1$, the decryption key $d_{1,1}$ for this time, and the encryption key $r_{1,2}$ for the next time present in a memory and the electronic ticket $T_{1,1}$ for this time present in the view management database 29.

The electronic ticket $T_{1,1}$ is set with an expiration date. If the electronic ticket $T_{1,1}$ expires during the use (viewing, for example) of the decrypted confidential file $F_1$, the view controller 27 stops displaying the confidential file $F_1$. Then, the view controller 27 performs the re-encryption of the common key $K_1$ (generation of the first key $X_{1,2}$ for the next time) and the deletion of related information stored in the memory and the view management database 29, similarly as after the use of the confidential file $F_1$ described above.

The above-description has been given of the flow of processing following the download of the encrypted confidential file $e(K_1, F_1)$ to the terminal apparatus 20, in which the terminal apparatus 20 acquires the first electronic ticket $T_{1,1}$ for the encrypted confidential file $e(K_1, F_1)$ and uses the encrypted confidential file $e(K_1, F_1)$ with the electronic ticket $T_{1,1}$. Similar processing is also performed when the terminal apparatus 20 acquires the second or subsequent electronic ticket for the same encrypted confidential file $e(K_1, F_1)$ and uses the encrypted confidential file $e(K_1, F_1)$ with the electronic ticket.

Database

Figure 4:
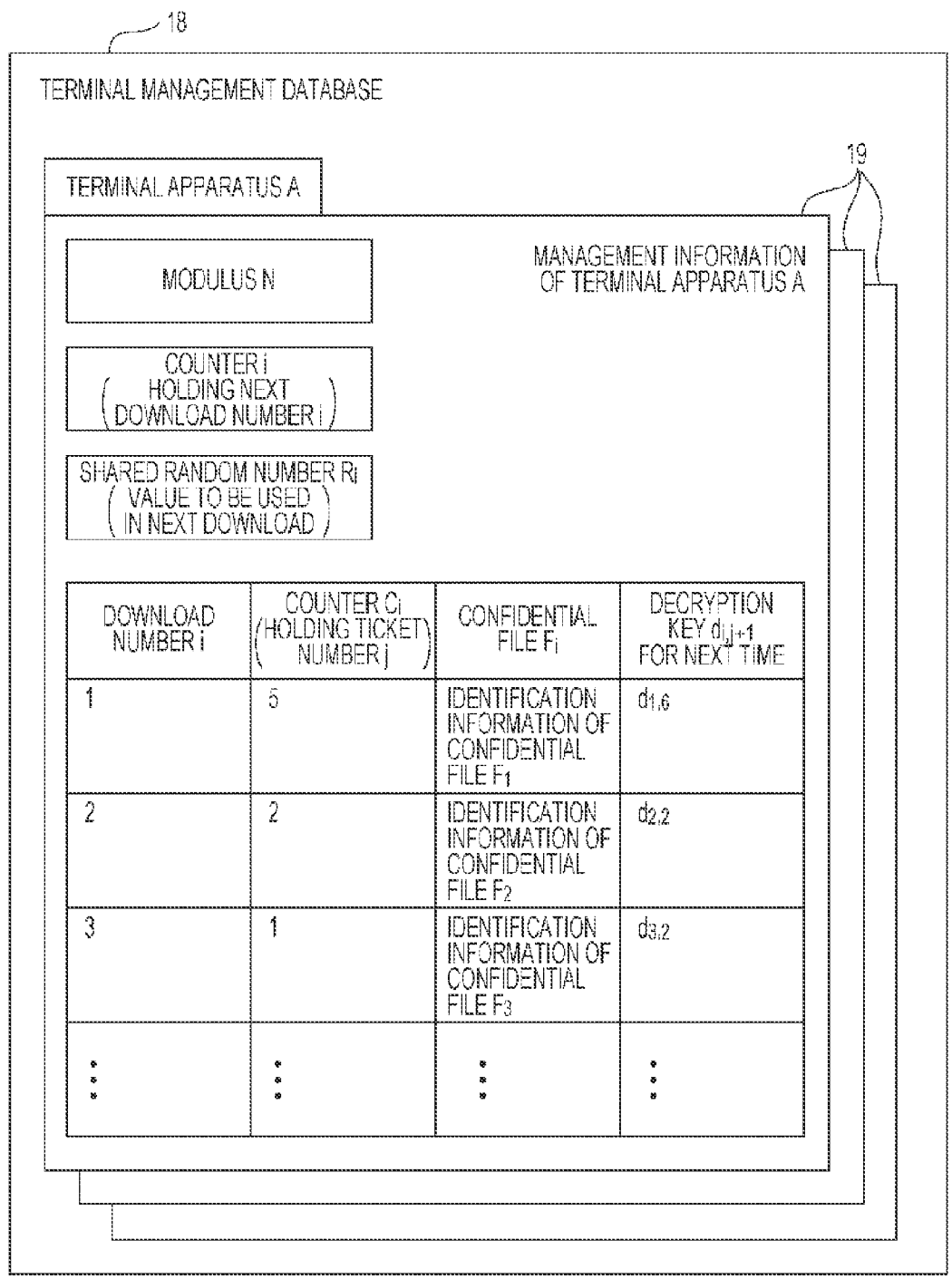
FIG. 4 is a diagram illustrating an example of data content of a terminal management database included in a confidential file management apparatus.

With reference to FIGS. 3 and 4, description will now be given of an example of data content stored in the view management database 29 and the terminal management database 18.

As illustrated in FIG. 3, the view management database 29 of the terminal apparatus 20 stores the modulus N unique to the terminal apparatus 20, a counter i for counting the download number i, and the shared random number $R_i$ transmitted from the management apparatus 10. In this data, the value i of the counter i represents the number of the next download, and the shared random number $R_i$ represents the value to be used in the next download. In other words, FIG. 3 illustrates the data content after the download of the (i−1)-th confidential file $F_{i-1}$ and before the download of the i-th confidential file $F_i$. The modulus N is a fixed value, while the respective values of the counter i and the shared random number $R_i$ are updated for each download of a confidential file.

The view management database 29 further stores, for each download number i, a counter $C_i$, the encrypted confidential file $e(K_i, F_i)$, the first key $X_{i,j}$, and the electronic ticket $T_{i,j}$ corresponding to the download number i.

The counter $C_i$ indicates the latest ticket number j of the electronic ticket $T_{i,j}$ for the confidential file $F_i$ corresponding to the download number i. During the use of the confidential file $F_i$ on the terminal apparatus 20 with the electronic ticket $T_{i,j}$, the latest ticket number j represents the ordinal number of the electronic ticket $T_{i,j}$ received by the terminal apparatus 20 for the confidential file $F_i$. When the first key $X_{i,j}$ is updated after the use of the confidential file $F_i$ (the above-described step c5), the value of the counter $C_i$ is incremented by one to j+1 to indicate the next electronic ticket $T_{i,j+1}$ for the confidential file $F_i$.

During the use of the confidential file $F_i$ with the electronic ticket $T_{i,j}$, the first key $X_{i,j}$ decryptable with the decryption key $d_{i,j}$ of the electronic ticket $T_{i,j}$ is held in the field of the first key $X_{i,j}$. After the use of the confidential file $F_i$, the value in the field is updated to a first key $X_{i,j+1}$ corresponding to an electronic ticket $T_{i,j+1}$ to be acquired next time.

The field of the electronic ticket $T_{i,j}$ may be implemented as a "ticket storage directory." The ticket storage directory holds the electronic ticket $T_{i,j}$ acquired from the management apparatus 10, until the end of the use of the confidential file $F_i$ with the electronic ticket $T_{i,j}$. After the use of the confidential file $F_i$, the electronic ticket $T_{i,j}$ is deleted from the ticket storage directory (the above-described step c5).

For example, as to a group of records corresponding to the download number 2 in the example of FIG. 3, the use of a first electronic ticket $T_{2,1}$ for the corresponding confidential file $F_2$ has ended, but a second electronic ticket $T_{2,2}$ for the confidential file $F_2$ has not been acquired. In this case, a first key $X_{2,2}$ corresponding to the second electronic ticket $T_{2,2}$ is held in the field of the first key $X_{i,j}$, and the electronic ticket corresponding to the download number 2 is not present in the ticket storage directory.

As illustrated in FIG. 4, the terminal management database 18 of the management apparatus 10 holds, for each terminal apparatus 20, management information of the terminal apparatus 20 in association with the identification information of the terminal apparatus 20. FIG. 4 illustrates, as a typical example, the management information of the terminal apparatus 20 corresponding to identification information "A" (hereinafter referred to as the "terminal apparatus A").

The management information includes the modulus N assigned and unique to the terminal apparatus A, the counter that counts the download number i of the terminal apparatus A, and the shared random number $R_i$ shared by the management apparatus 10 and the terminal apparatus A. The stored counter i and shared random number $R_i$ are the same in meaning as the counter i and the shared random number $R_i$ held in the view management database 29 of the terminal apparatus 20.

The management information of the terminal apparatus A further includes, for each download number i, the counter $C_i$, the confidential file $F_i$, and a decryption key $d_{i,j+1}$ for the next time corresponding to the download number i. The download number i and the counter $C_i$ are the same as the download number i and the counter $C_i$ of the view management database 29. The download number i and the counter $C_i$ are updated in synchronization between the databases 18 and 29. The field of the confidential file $F_i$ holds, for example, identification information uniquely identifying the confidential file $F_i$ in the management apparatus 10. With reference to the identification information, the management apparatus 10 is capable of identifying the confidential file $F_i$ provided to the terminal apparatus A in the i-th place. If there is no need to later identify the confidential file $F_i$ provided to the terminal apparatus 20, the identification information of the confidential file $F_i$ may not be stored. The decryption key $d_{i,j+1}$ for the next time is generated by the ticket issuing unit 16 at the above-described step C1, and is stored to be incorporated in the electronic ticket $T_{i,j+1}$ for the confidential file $F_i$ to be issued next time to the terminal apparatus A.

The management apparatus 10 and the terminal apparatus 10 execute the processing described with reference to FIG. 2, while referring to the databases 18 and 29, registering therein information, and updating the information stored therein.

Specific Example

Figure 5:
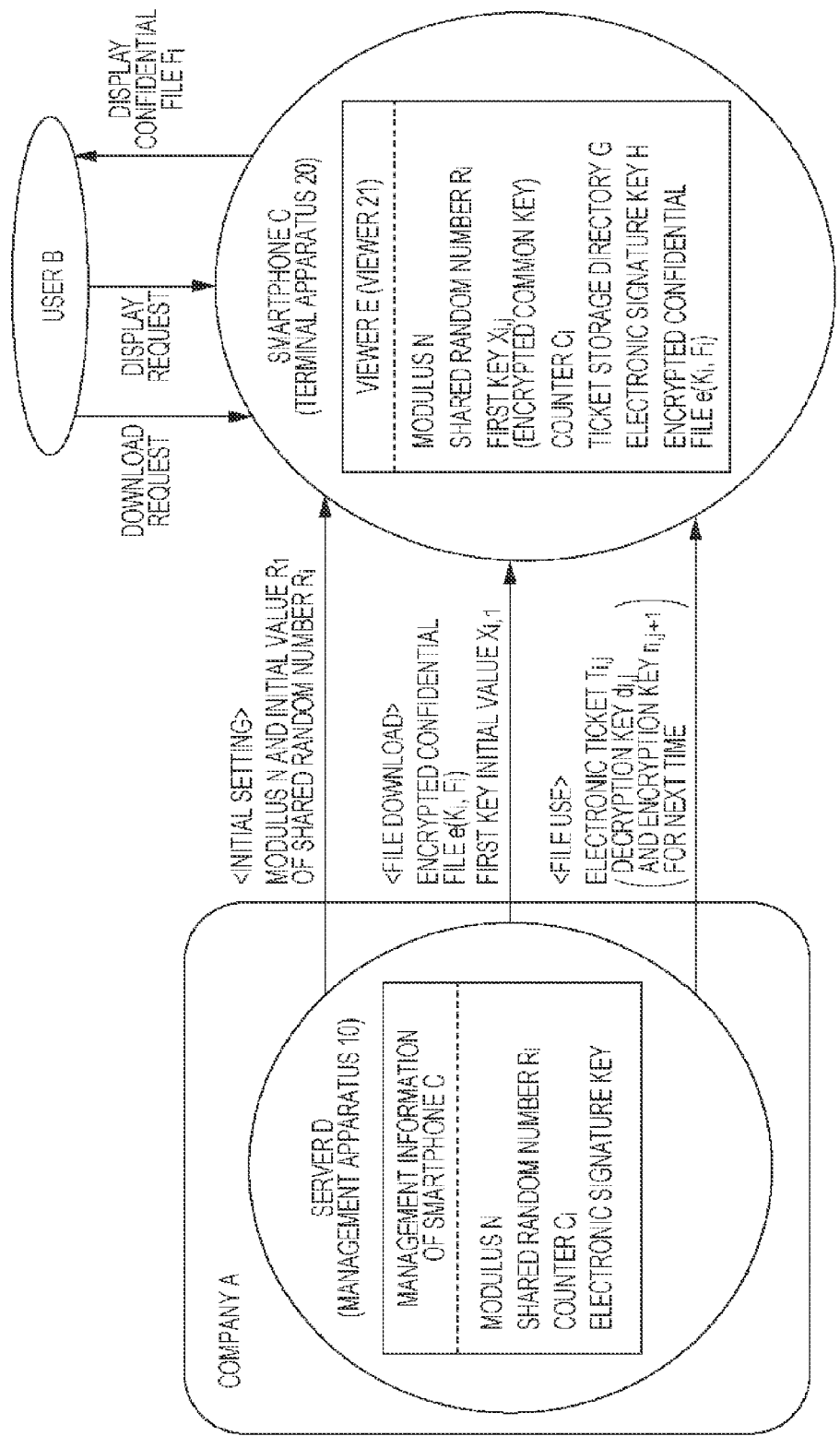
FIG. 5 is a diagram for describing an example in which the system of the exemplary embodiment is applied to a specific situation.

With reference to FIG. 5, description will be given below of an example in which the system of the present exemplary embodiment is applied to a specific situation. It is assumed in this example that a user B, who is a sales person of a company A, downloads plural confidential files describing confidential information of the company A to a smartphone C (an example of the terminal apparatus 20) used by the user B, and views the confidential files outside the company A for sales work. It is further assumed that the confidential files are stored in a disk of a server D (an example of the confidential file management apparatus 10), with the confidential files encrypted with respective different 256-bit keys according to the Advanced Encryption Standard (AES) cryptosystem (the AES cryptosystem and the key length of 256 bits are mere examples, and another cryptosystem and another key length may be used). According to the foregoing description, a common key is generated and used to encrypt the confidential file in the process of downloading a confidential file. Meanwhile, in the present example, each of the confidential files in the server D is previously encrypted and stored in the form of an encrypted confidential file.

The smartphone C used by the user B is installed with a viewer E (an example of the viewer 21) for decrypting the encrypted confidential file and presenting the decrypted confidential file to the user B. The user B views the confidential file by using the viewer E. It is assumed in the following that, in addition to the AES cryptosystem, the RSA cryptosystem as a public key cryptosystem is used to protect the confidential file (the RSA cryptosystem is a mere example, and another cryptosystem may be employed).

In an initial setting operation, the server D generates the initial value $R_1$ of the shared random number $R_i$ of 2048 bits for the smartphone C of the user B. The data length of 2048 bits is a mere example. Further, prior to the use of the confidential file $F_i$ by the user B, the server D previously transmits the initial value $R_1$ of the shared random number $R_i$ and the modulus N of the RSA cryptosystem to the smartphone C through a safe path such as a virtual private network (VPN).

In this example, the confidential file $F_i$ (i=1, 2, ... ) is encrypted with a cryptosystem such as the 256-bit AES cryptosystem, as described above. Herein, an encryption key used to encrypt the confidential file $F_i$ is represented as $K_i$. The encryption key $K_i$ is a common key used in both the encryption performed by the server D and the decryption performed by the smartphone C.

The viewer E of the smartphone C stores the initial value $R_1$ of the shared random number $R_i$ and the modulus N transmitted from the server D in the initial setting operation.

A procedure following the initialization, in which the user B acquires and uses the confidential file $F_i$ (i=1, 2, ... ), is as follows. Herein, the confidential file $F_i$ is transmitted to the smartphone C from the server D in the i-th place. The smartphone C downloads the confidential file $F_i$ in an encrypted form from the server D via a public network such as the Internet. The confidential file $F_i$ is encrypted with the AES cryptosystem using the encryption key $K_i$ as the common key, and thus is represented as the encrypted confidential file $e(K_i, F_i)$.

The user B downloads the confidential file $F_i$ in the encrypted form (the encrypted confidential file $e(K_i, F_i)$), which the user B wants to use, to the smartphone C from the server D, and thereafter acquires the electronic ticket $T_{i,j}$ from the serve D when using the confidential file $F_i$.

Figure 6:
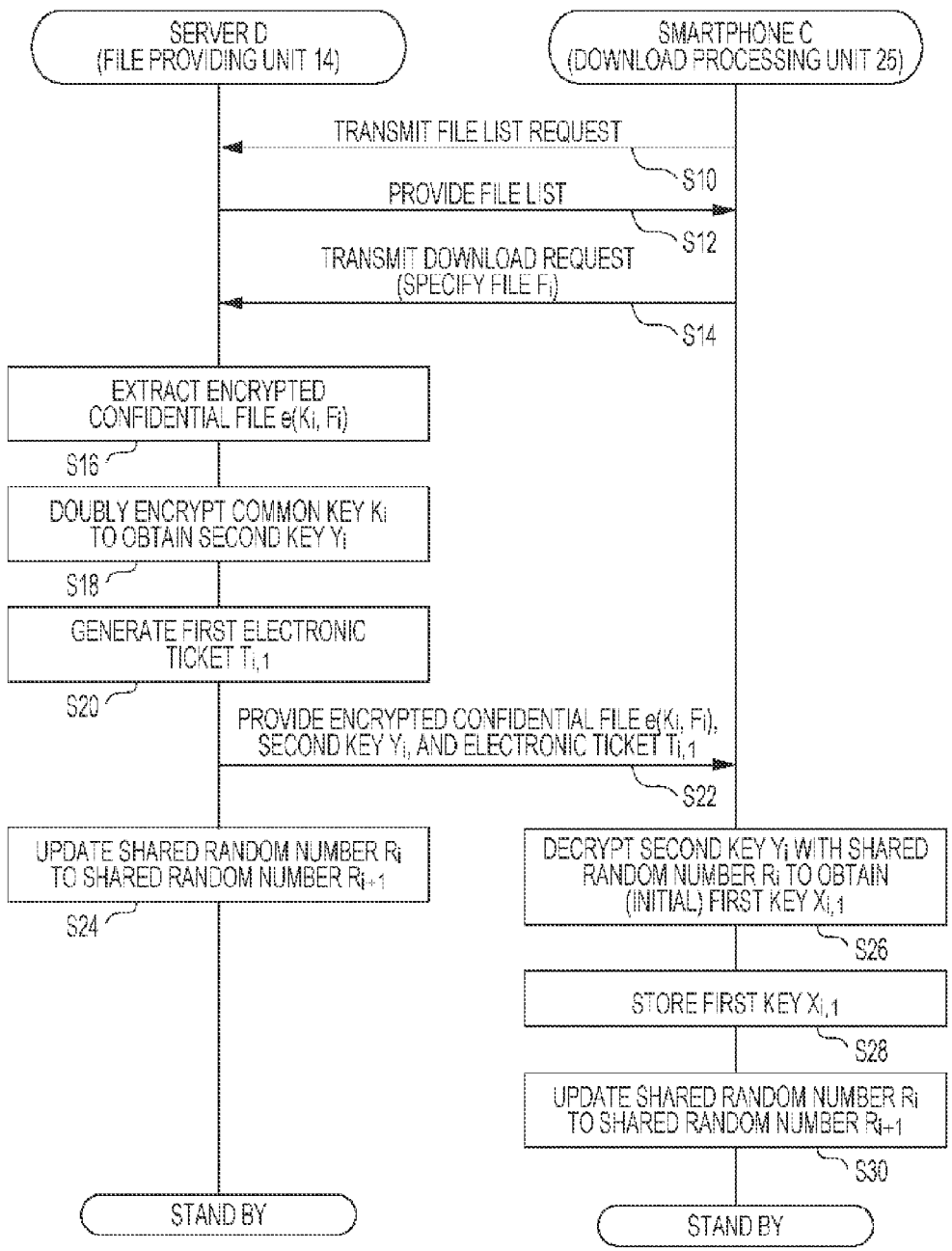
FIG. 6 is a diagram illustrating an example of a flow of processing at a download step.

The process of downloading a confidential file is performed in the flow illustrated in FIG. 6, for example.

In this procedure, the user B operates the viewer E of the smartphone C, and requests the server D to transmit a list of confidential files which the user B is authorized to access. The request is transmitted to the server D from the viewer E (step S10).

In response to the request, the server D generates the list of confidential files accessible by the user B, and returns the list to the smartphone C (step S12).

Figure 7:
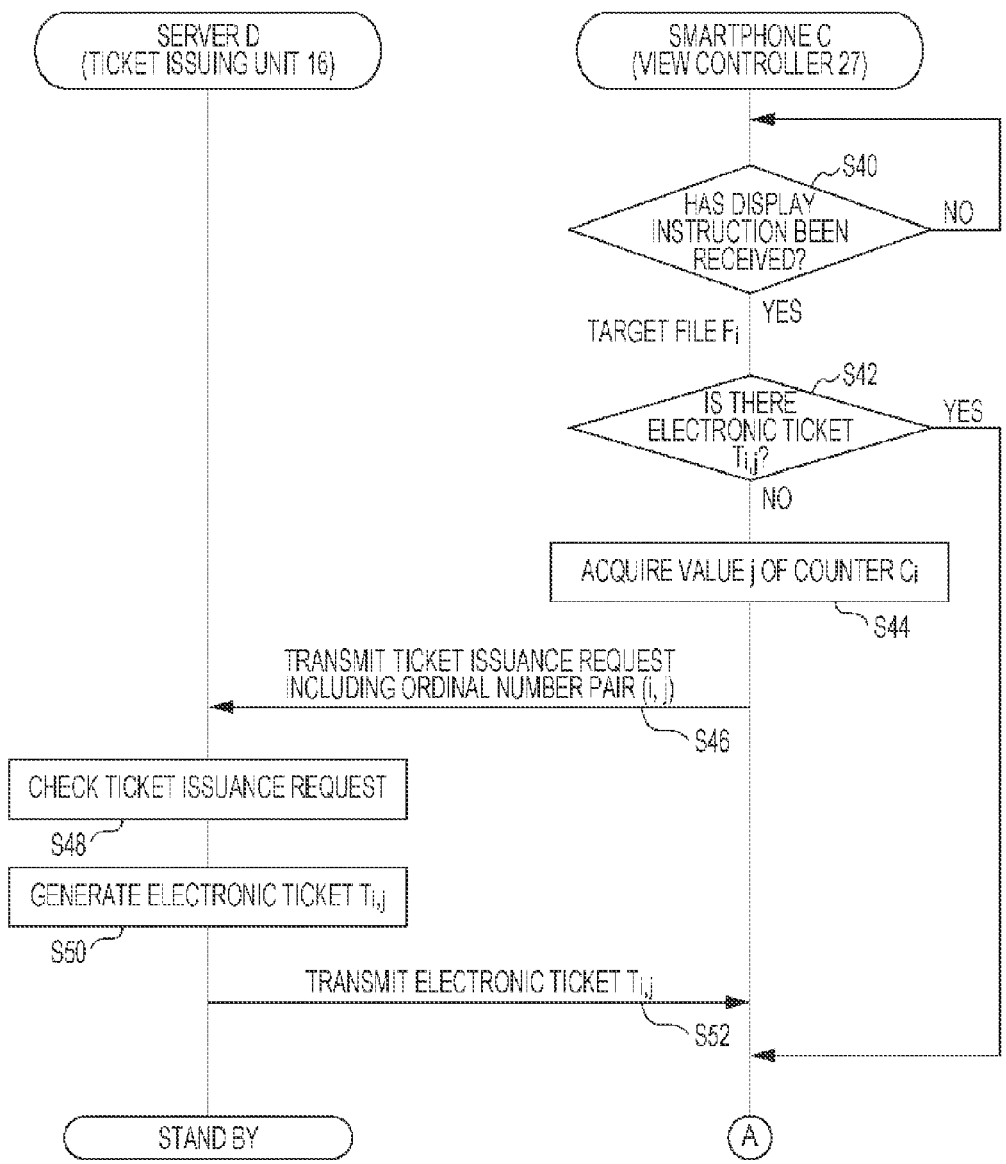
FIG. 7 is a diagram for describing processes up to the acquisition of an electronic ticket in a processing flow at a step of using a confidential file downloaded to the terminal apparatus.
Figure 8:
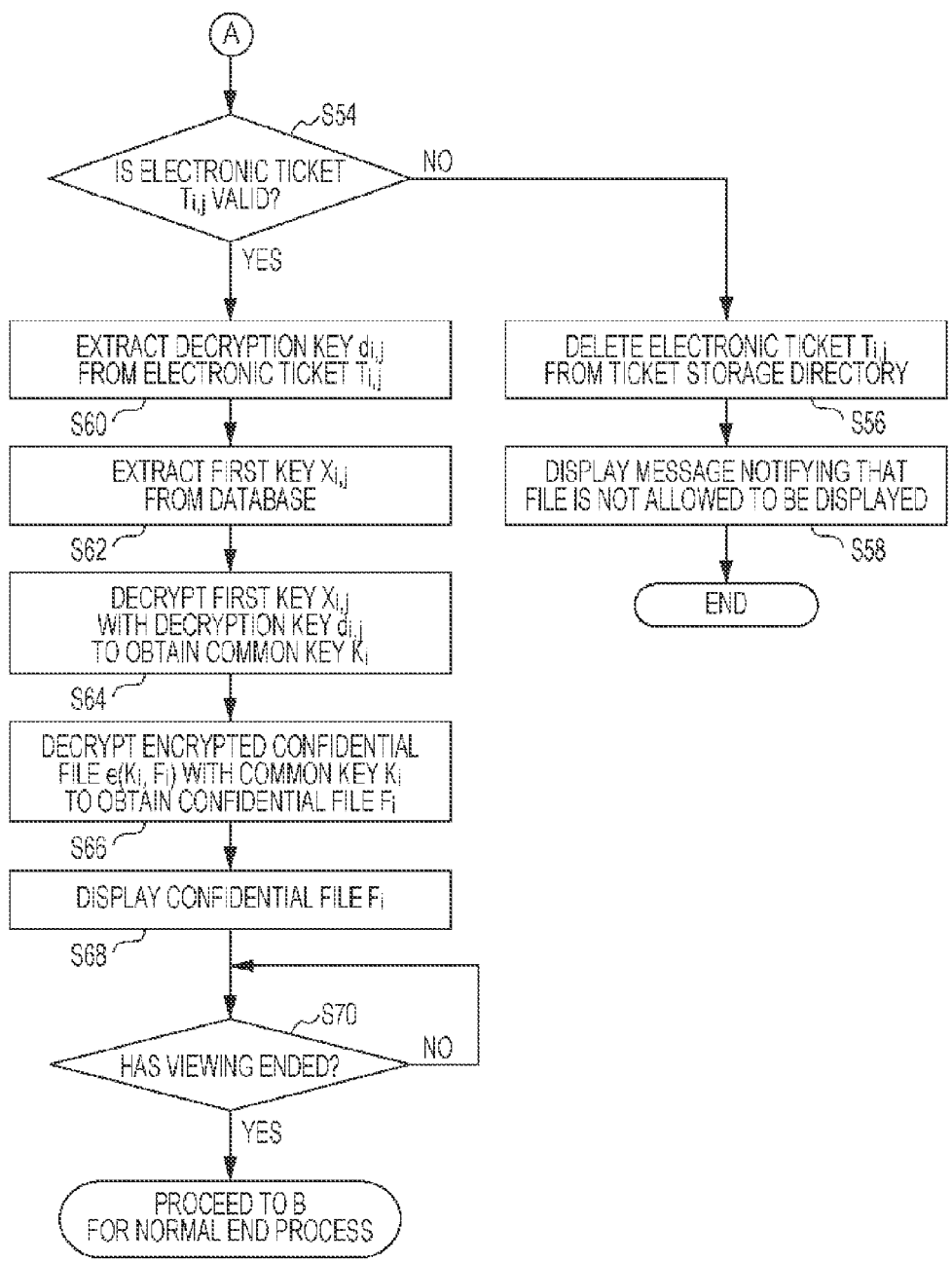
FIG. 8 is a diagram for describing processes up to the viewing of the confidential file with the electronic ticket in the processing flow at the step of using the confidential file downloaded to the terminal apparatus.
Figure 9:
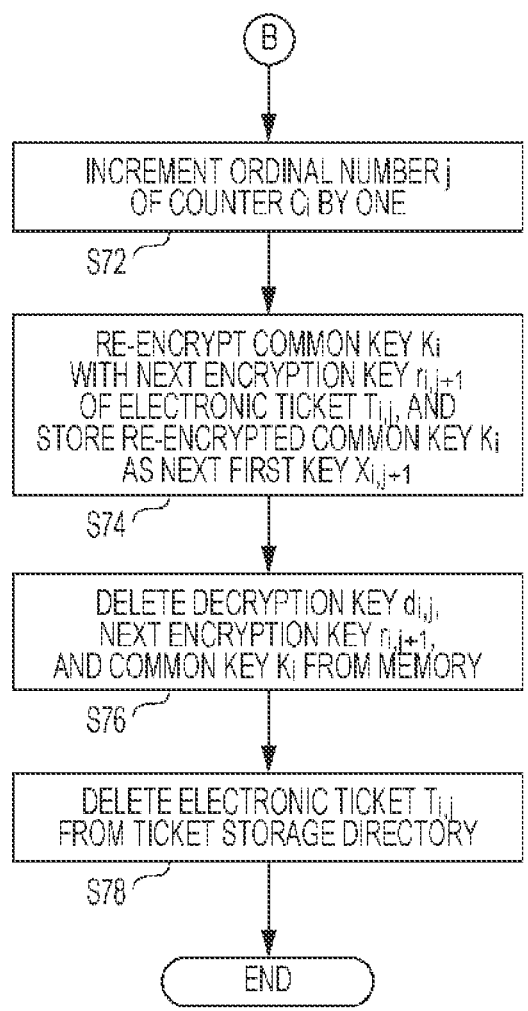
FIG. 9 is a diagram for describing an end process after the end of viewing of the confidential file in the processing flow at the step of using the confidential file downloaded to the terminal apparatus.

The viewer E of the smartphone C displays the list. The user B selects from the list a confidential file which the user B wants to use. If the confidential file selected by the user B has already been downloaded to the smartphone C, the procedure proceeds to the later-described step of using the file (FIGS. 7 to 9). If the confidential file selected by the user B has not been downloaded, the viewer E transmits to the server D a download request including the identification information of the confidential file (step S14). The download request is assumed to have been transmitted in the i-th place after the initial setting. The requested confidential file will hereinafter be designated by a sign $F_i$.

The server D extracts from the terminal management database 18 the encrypted confidential file $e(K_i, F_i)$ corresponding to the confidential file $F_i$ requested by the viewer E (step S16). Further, the server D doubly encrypts the common key $K_i$ used to generate the encrypted confidential file $e(K_i, F_i)$, to thereby obtain the second key $Y_i$ (step S18). More specifically, the double encryption process is performed as follows.

The server D first encrypts the common key $K_i$ with a public key cryptosystem such as the RSA cryptosystem (first encryption). In the first encryption, a 256-bit random number $r_{i,1}$, for example, is used as an encryption key. In one example, a random number $r_{i,j}$ (i, j=1, 2, ... ) is generated by a predetermined random number generation method such as the linear shift register method, and is used as one of keys of a key pair according to the RSA encryption. The random number, i.e., the encryption key $r_{i,1}$ used in the first encryption of the common key $K_i$ performed by the server D corresponds to the initial value of the random number generated by the random number generation method.

In this process, a decryption key $d_{i,1}$ corresponding to the encryption key $r_{i,1}$ is also generated by, for example, the Euclidean algorithm.

That is, the server D holds 1024-bit primes p and q as confidential information to calculate the decryption key $d_{i,j}$ corresponding to the encryption key $r_{i,1}$. The primes p and q are prime factors of the modulus N assigned to the smartphone C at the initial setting, and a relationship "N=pq" holds. The modulus N is uniquely assigned to the smartphone C. Another smartphone is assigned with a modulus different from the above-described modulus N. Even if a smartphone is lost or stolen, therefore, the security of another smartphone is unaffected.

With the Euclidean algorithm, the server D calculates a positive integer $d_{i,j}$ satisfying the following expression (1), and determines the integer $d_{i,j}$ as the decryption key corresponding to the encryption key $r_{i,j}$.

$$r_{i,j}d_{i,j} \equiv 1 \bmod (p-1)(q-1) \qquad (1)$$

Herein, the decryption key $d_{i,1}$ corresponding to the first encryption key $r_{i,1}$ is calculated by the above-described method. The calculated decryption key $d_{i,1}$ is temporarily stored in the server D and later incorporated in a first electronic ticket $T_{i,1}$.

Returning to the description of the encryption of the common key $K_i$, the server D performs encryption (first encryption) of the common key $K_i$ with the encryption key $r_{i,1}$, to thereby generate a first key initial value $X_{i,1}$, which is an encrypted common key. Specifically, the first key initial value $X_{i,1}$ is the minimum positive integer equal in value to $K_i^{r_{i,1}}$ mod N.

Then, the server D further performs encryption (second encryption) of the first key initial value $X_{i,1}$ with the shared random number $R_i$. For example, a bitwise exclusive OR of the first key initial value $X_{i,1}$ and the shared random number $R_i$ represented by the following expression (2) is used as a specific method of the second encryption (the method is of course not limited thereto).

$$X_{i,1} \oplus R_i \qquad (2)$$

The second key $Y_i$ represented by the following expression (3) is obtained by the above-described second encryption.

$$Y_i = X_{i,1} \oplus R_i \qquad (3)$$

In this specific example, the first electronic ticket $T_{i,1}$ for using the confidential file $F_i$ is provided to the smartphone C from the server D in the process of downloading the confidential file $F_i$. Therefore, the server D generates the first electronic ticket $T_{i,1}$ for the confidential file $F_i$ in accordance with the following procedure (step S20).

To generate the electronic ticket $T_{i,1}$, the server D first generates a second encryption key $r_{i,2}$ for the first encryption of the common key $K_i$ in accordance with a random number generation method such as the linear shift register method. The second encryption key $r_{i,2}$ is used to re-encrypt the common key $K_i$ decrypted with the decryption key Then, the server D generates the electronic ticket $T_{i,1}$ including a pair of ordinal numbers i (download number) and j (ticket number, which is "1" in this case), the stored first decryption key $d_{i,1}$, the second encryption key $r_{i,2}$ generated this time, and expiration date information of the electronic ticket $T_{i,1}$.

Further, the server D calculates a decryption key $d_{i,2}$ corresponding to the second encryption key $r_{i,2}$ in accordance with Euclidean algorithm or the like. The second decryption key $d_{i,2}$ is temporarily stored in the server D and later incorporated in a next electronic ticket $T_{i,2}$ for the confidential file $F_i$ to be issued to the smartphone C.

The above description has been given of the first electronic ticket $T_{i,1}$ for the confidential file $F_i$. In general, the first electronic ticket $T_{i,1}$ for the confidential file $F_i$ includes the ordinal numbers i and j, the decryption key $d_{i,j}$ to be used this time, an encryption key $r_{i,j+1}$ to be used for the re-encryption, and the expiration date information of the electronic ticket $T_{i,1}$, as in this specific example.

Then, the server D transmits the encrypted confidential file $e(K_i, F_i)$, the second key $Y_i$, and the first electronic ticket $T_{i,1}$ to the smartphone C (step S22). The transmission does not require the use of a safe path, and may be performed via a public network such as a third-generation (3G) network, for example.

Further, after the generation of the second key $Y_i$, the server D updates the shared random number $R_i$ to the shared random number $R_{i+1}$ (step S24). The update is performed with a common one-way function HF shared by the server D and the smartphone C. That is, the server D calculates the shared random number $R_{i+1}$ from the shared random number $R_i$ on the basis of the following expression (4).

$$R_{i+1} = HF(R_i) \qquad (4)$$

Then, the server D discards the pre-update shared random number $R_i$, and stores the post-update shared random number $R_{i+1}$ in preparation for the next download by the smartphone C.

Even if a third party other than the user B steals a glance at the second key $Y_i$ transmitted to the smartphone C from the server D and obtains the smartphone C, the shared random number $R_i$ necessary for decrypting the second key $Y_i$ is no longer present in the smartphone C. This is because, immediately after the receipt of the second key $Y_i$ from the server D, the smartphone C decrypts the second key $Y_i$ with the shared random number $R_i$, updates the shared random number $R_i$ to the next value $R_{i+1}$, and deletes the shared random number $R_i$. Even if the third person has the second key $Y_i$, therefore, the third person is unable to obtain the correct first key $X_{i,1}$ owing to the lack of the shared random number $R_i$, and thus is unable to open the encrypted confidential file $e(K_i, F_i)$ present in the smartphone C. The shared random number $R_{i+1}$ present in the smartphone C at this point in time corresponds to a second key $Y_{i+1}$ for an encrypted confidential file $e(K_{i+1}, F_{i+1})$ which is to be downloaded next time by the smartphone C, and the second key $Y_{i+1}$ and the encrypted confidential file $e(K_{i+1}, F_{i+1})$ are not present in the smartphone C yet.

Description will now be given of the processing performed by the smartphone C.

Having received the encrypted confidential file $e(K_i, F_i)$ and so forth transmitted by the server D at step S22, the smartphone C first decrypts the received second key $Y_i$ with the shared random number $R_i$ held by the smartphone C, to thereby calculate the initial first key $X_{i,1}$ corresponding to the confidential file $F_i$ (step S26). In the calculation, an exclusive OR of the second key $Y_i$ and the shared random number $R_i$ may be calculated, as described in the following expression (5).

$$X_i = (X_i \oplus R_i) \oplus R_i = Y_i \oplus R_i \tag{5}$$

The smartphone C stores the calculated first key $X_{i,1}$ (step S28).

Then, the smartphone C updates the shared random number $R_i$ to the shared random number $R_{i+1}$ (step S30). The update may be performed with, for example, the foregoing expression (4) using the common one-way function HF shared by the server D and the smartphone C, similarly as in the update performed by the server D. For example, the common one-way function HF may previously be incorporated in the viewer E, or may be provided to the smartphone C by the server D at the initial setting.

In the above-described example, the first electronic ticket $T_{i,1}$ corresponding to the encrypted confidential file $e(K_i, F_i)$ is transmitted to the smartphone C from the server D at the same time as the transmission of the encrypted confidential file $e(K_i, F_i)$. As another example, only the encrypted confidential file $e(K_i, F_i)$ may previously be transmitted to the smartphone C from the server D, and the first electronic ticket $T_{i,1}$ may be transmitted to the smartphone C in accordance with the electronic ticket request later transmitted from the smartphone C.

With reference to FIGS. 7 to 9, description will now be given of an example of a procedure for using (viewing, for example) the downloaded encrypted confidential file $e(K_i, F_i)$ on the smartphone C.

The viewer E installed in the smartphone C includes the number of counters $C_i$ for recording the ordinal number (ticket number) j assigned to the encryption key $r_{i,j}$, a ticket storage directory G for storing the electronic ticket $T_{i,j}$, and an electronic signature key H assigned to the viewer E. The i-th counter $C_i$ is created when, for example, the encrypted confidential file $e(K_i, F_i)$ is downloaded or the first electronic ticket $T_{i,1}$ corresponding to the encrypted confidential file $e(K_i, F_i)$ is transmitted to the smartphone C. The counter $C_i$ is set to the initial value of "1" when created.

If the user B instructs the viewer E to display the confidential file $F_i$ (YES at step S40), the viewer E first searches through the ticket storage directory G in the view management database 29 for the electronic ticket $T_{i,j}$ necessary for displaying the confidential file $F_i$ (step S42). In the present example, the electronic ticket $T_{i,j}$ used to open the confidential file $F_i$ is discarded when the confidential file $F_i$ is closed. Therefore, at most one electronic ticket $T_{i,j}$ for opening the confidential file $F_i$ is present in the smartphone C (i.e., only one electronic ticket $T_{i,j}$ or no electronic ticket $T_{i,j}$ is present therein). At this step, therefore, it suffices to check whether or not the electronic ticket $T_{i,j}$ having the ordinal number i corresponding to the download number i of the confidential file $F_i$ specified as the target to be used is present in the ticket storage directory G.

If the electronic ticket $T_{i,j}$ necessary for displaying the confidential file $F_i$ is found in the ticket storage directory G, the procedure proceeds to step S54 in FIG. 8 (described in detail later).

If the electronic ticket $T_{i,j}$ necessary for displaying the confidential file $F_i$ is not found in the ticket storage directory G, the viewer E acquires the value (ticket number) j of the counter $C_i$ corresponding to the download number i of the confidential file $F_i$ specified as the target to be used (step S44). Then, the viewer E generates a ticket issuance request including a pair of the download number i and the ticket number j, and attaches an electronic signature to the ticket issuance request with the electronic signature key H of the viewer E. Then, the viewer E transmits the ticket issuance request with the electronic signature to the server D (step S46). The communication path used to transmit the ticket issuance request is not required to be a safe path, and may be a common 3G network or the like.

Upon receipt of the ticket issuance request, the server D checks whether or not the electronic signature of the ticket issuance request is valid (step S48). If the electronic signature is valid, the ticket issuing unit 16 of the server D generates the electronic ticket $T_{i,j}$ including the decryption key $d_{i,j}$ for this time corresponding to the ordinal number pair (i, j) included in the ticket issuance request, the encryption key $r_{i,j+1}$ for the next time, and the expiration date information (step S50). Then, the ticket issuing unit 16 transmits the electronic ticket $T_{i,j}$ attached with an electronic signature of the server D to the smartphone C (step S52). Upon receipt of the electronic ticket $T_{i,j}$ from the server D, the smartphone C proceeds to step S54 in FIG. 8.

If the electronic ticket $T_{i,j}$ is found in the ticket storage directory G at step S42 or acquired from the server D at step S52, the smartphone C checks the electronic ticket $T_{i,j}$, as illustrated in FIG. 8 (step S54). In the check, whether or not the electronic signature of the server D attached to the electronic ticket $T_{i,j}$ is valid, whether or not the ordinal number pair (i, j) included in the electronic ticket $T_{i,j}$ is valid, and whether or not the expiration date indicated by the expiration date information included in the electronic ticket $T_{i,j}$ is over are checked. In the check of the ordinal number pair (i, j), it is checked whether or not the ordinal number pair (i, j) included in the electronic ticket $T_{i,j}$ matches the pair of the download number i of the confidential file $F_i$ as the target to be used and the ordinal number j indicated by the counter $C_i$ corresponding to the download number i. If the ordinal number pair (i, j) matches the pair of the download number i and the ordinal number j of the counter $C_i$, the ordinal number pair (i, j) is valid.

If at least one of the invalid electronic signature, the invalid ordinal number pair (i, j), and the expired electronic ticket $T_{i,j}$ is detected in the check at step S54, the electronic ticket $T_{i,j}$ is determined to be invalid. In this case, the viewer E of the smartphone C deletes the electronic ticket $T_{i,j}$ from the ticket storage directory G (step S56), and displays on a screen a message notifying that the specified confidential file is not allowed to be displayed because of the lack of a valid electronic ticket (step S58).

If the electronic signature and the ordinal number pair (i, j) are valid and the electronic ticket $T_{i,j}$ has not expired in the check at step S54, the electronic ticket $T_{i,j}$ is determined to be valid. In this case, the viewer E extracts the decryption key $d_{i,j}$ from the electronic ticket $T_{i,j}$ (step S60), and acquires the first key $X_{i,j}$ corresponding to the download number i of the confidential file $F_i$ from the view management database 29 (step S62). Then, the viewer E decrypts the first key $X_{i,j}$ with the decryption key $d_{i,j}$ to thereby obtain the common key $K_i$ (step S64).

In the decryption, the minimum positive integer equal in value to $X_{i,j} \hat{\ } d_{i,j} \bmod N$ is calculated for the first key $X_{i,j}$. In this case, according to the following expression (6) and the Euler's theorem, the following expression (7) holds.

$$r_{i,j} d_{i,j} \equiv 1 \bmod (p-1)(q-1) \tag{6}$$

$$X_i \hat{\ } d_{i,j} \equiv (K_i \hat{\ } r_{i,j}) \hat{\ } d_{i,j} \equiv K_i \bmod N \tag{7}$$

It is therefore understood that it is possible to normally decrypt the common key $K_i$ through the above-described calculation.

The obtained common key $K_i$ is placed in, for example, a memory (first memory) of the smartphone C. Then, the viewer E decrypts the encrypted confidential file $e(K_i, F_i)$ with the common key $K_i$ to obtain the confidential file $F_i$ in plain text (step S66), and displays the obtained confidential file $F_i$ on the screen to allow the user B to operate the confidential file $F_i$ (step S68).

Thereafter, the viewer E waits for the input of an instruction from the user B to end the use of the confidential file $F_i$ (step S70). Upon input of the instruction, the procedure proceeds to an end process illustrated in FIG. 9.

In the end process illustrated in FIG. 9, the viewer E increments by one the value j of the counter $C_i$ corresponding to the download number i of the confidential file $F_i$ (step S72). Thereby, the counter $C_i$ indicates the ticket number of the next electronic ticket $T_{i,j+1}$ corresponding to the confidential file $F_i$. Further, with the next encryption key $r_{i,j+1}$ included in the electronic ticket $T_{i,j}$ used this time, the viewer E re-encrypts the common key $K_i$ used to decrypt the encrypted confidential file $e(K_i, F_i)$ (step S74). It is possible to decrypt the first key $X_{i,j+1}$ obtained by the re-encryption, by acquiring the next electronic ticket $T_{i,j+1}$ corresponding to the confidential file $F_i$. The first key $X_{i,j+1}$ for the next time is stored in the view management database 29 in association with the download number i. The first key $X_{i,j}$ for this time stored so far is deleted from the view management database 29. Then, the viewer E deletes the confidential file $F_i$, the decryption key $d_{i,j}$, the next encryption key $r_{i,j+1}$, and the common key $K_i$ from the memory of the smartphone C (step S76), and further deletes the electronic ticket $T_{i,j}$ used this time from the ticket storage directory G (step S78).

If the electronic ticket $T_{i,j}$ expires while the user B is using the confidential file $F_i$ with the electronic ticket $T_{i,j}$, the viewer E stops displaying the confidential file $F_i$, performs the end process illustrated in FIG. 9, and displays on the screen the message notifying the expiration of the electronic ticket $T_{i,j}$.

In the above-described example, the first key $X_{i,j}$ in the view management database 29 is replaced by the first key $X_{i,j+1}$ for the next time at step S74 of the end process (FIG. 9). The replacement process, however, may be performed immediately after the decryption of the first key $X_{i,j}$ into the common key $K_i$ at step S64 in FIG. 8. The first key $X_{i,j}$ becomes unnecessary after the common key $K_i$ is obtained. Therefore, there is no problem in replacing the first key $X_{i,j}$ with the first key $X_{i,j+1}$ for the next time immediately after the decryption for obtaining the common key $K_i$. With the first key $X_{i,j}$ replaced by the first key $X_{i,j+1}$ for the next time immediately after the first key $X_{i,j}$ becomes unnecessary, the security of the confidential file $F_i$ is rather increased. This is because, with this replacement, the first key $X_{i,j}$ decryptable with the electronic ticket $T_{i,j}$ is no longer present in the smartphone C after the decryption for obtaining the common key $K_i$, even if the electronic ticket $T_{i,j}$ is present in the smartphone C. If the smartphone C is stolen, therefore, the common key $K_i$ is unobtainable from the information stored in the smartphone C. If the smartphone C is stolen, and if the user B immediately requests the server D to stop issuing electronic tickets to the smartphone C, the encrypted confidential file $e(K_i, F_i)$ stored in the smartphone C is safely protected.

As described above, in the present exemplary embodiment, when the information of the common key $K_i$ (i.e., the first key $X_{i,1}$ obtained by the first encryption of the common key $K_i$) is provided to the terminal apparatus 20 from the management apparatus 10, the information of the common key $K_i$ is subjected to the encryption (second encryption) with the shared random number $R_i$ safely shared by the management apparatus 10 and the terminal apparatus 20. Even if a third party obtains the information of the common key $K_i$ transmitted over the communication path (the second key $Y_i$), therefore, the third person is unable to obtain the shared random number $R_i$ and thus unable to obtain the common key $K_i$.

Further, every time one encrypted confidential file $e(K_i, F_i)$ is downloaded, the shared random number $R_i$ is updated by the management apparatus 10 and the terminal apparatus 20 in accordance with the method common thereto. For each encrypted confidential file $e(K_i, F_i)$, therefore, the common key $K_i$ necessary for decrypting the encrypted confidential file $e(K_i, F_i)$ is transmitted to the terminal apparatus 20 from the management apparatus 10 in an encrypted form (the second key $Y_i$) encrypted with the shared random number $R_i$, which is different for each download. Even if a third person succeeds in decrypting the common key $K_i$ from a certain second key $Y_i$, therefore, the third person is unable to decrypt another common key corresponding to another confidential file by using the information obtained from the decryption (the shared random number $R_i$).

Further, in the present exemplary embodiment, when the shared random number $R_i$ is updated to the shared random number $R_{i+1}$, the original shared random number $R_i$ is deleted from the view management database 29 of the terminal apparatus 20. Accordingly, only the shared random number $R_{i+1}$ corresponding to the encrypted confidential file $e(K_{i+1}, F_{i+1})$ to be downloaded next time is constantly present in the terminal apparatus 20. Thus, the shared random number ($R_i$, for example) corresponding to the encrypted confidential file downloaded in the past is no longer present. Even if a third person obtains the second key ($Y_i$, for example) transmitted over the communication path in the past and also obtains the terminal apparatus 20, therefore, the past second key ($Y_i$, for example) is not decryptable with the shared random number $R_{i+1}$ currently present in the obtained terminal apparatus 20. With the above-described mechanism, the security of the encrypted confidential file $e(K_i, F_i)$ stored in the terminal apparatus 20 is maintained even if the terminal apparatus 20 is stolen, for example.

Further, in the present exemplary embodiment, if the initial value $R_1$ of the shared random number $R_i$ and the modulus N are once provided to the terminal apparatus 20 from the management apparatus 10 through a safe path such as a VPN at the initial setting step, it is no longer necessary to use a safe path when providing the terminal apparatus 20 with plural confidential files $F_i$ and the respective second keys $Y_i$ corresponding thereto. When the terminal apparatus 20 uses each of the confidential files $F_i$, therefore, there is no need for a troublesome procedure, such as the establishment of VPN connection with the management apparatus 10 by the terminal apparatus 20.

Further, in the present exemplary embodiment, the common key $K_i$ for decrypting the encrypted confidential file $e(K_i, F_i)$ is stored in the terminal apparatus 20 (the smartphone C) in the form subjected to the first encryption, i.e., in the form of the first key $X_{i,j}$. To obtain the common key $K_i$ by decrypting the first key $X_{i,j}$, the terminal apparatus 20 needs to acquire the electronic ticket $T_{i,j}$ from the management apparatus 10. In the present exemplary embodiment, the electronic ticket $T_{i,j}$ includes the encryption key $r_{i,j+1}$ for re-encrypting the common key $K_i$. Then, if the electronic ticket $T_{i,j}$ expires, the terminal apparatus 20 re-encrypts the common key $K_i$ with the encryption key $r_{i,j+1}$ for the re-encryption, replaces the original first key $X_{i,j}$ with the first key $X_{i,j+1}$ for the next time obtained by the re-encryption to thereby store the first key $X_{i,j+1}$ (update of the first key $X_{i,j}$), and deletes the common key $K_i$. The first key $X_{i,j+1}$ for the next time is not decryptable before the next electronic ticket $T_{i,j+1}$ for the confidential file $F_i$ is acquired from the management apparatus 10. At least before the acquisition of the next electronic ticket $T_{i,j+1}$, therefore, the first key $X_{i,j+1}$ for the next time is not decryptable with the information stored in the terminal apparatus 20, and thus the encrypted confidential file $e(K_i, F_i)$ is neither decryptable.

Further, in an example of the above-described exemplary embodiment, every time the confidential file $F_i$ is used on the terminal apparatus 20 with the electronic ticket $T_{i,j}$ (every time the use of the confidential file $F_i$ ends), the electronic ticket $T_{i,j}$ is discarded, and the first key $X_{i,j}$ is updated to the first key $X_{i,j+1}$. In this example, all information necessary for decrypting the encrypted confidential file $e(K_i, F_i)$ is not present in the terminal apparatus 20 when the confidential file $F_i$ is not used (i.e., the electronic ticket $T_{i,j+1}$ necessary for decrypting the first key $X_{i,j+1}$ is not present in the terminal apparatus 20 during the time from the end of the use of the confidential file $F_i$ to the acquisition of the next electronic ticket $T_{i,j+1}$) Therefore, even if the terminal apparatus 20 is stolen during the time, for example, the security of the encrypted confidential file $e(K_i, F_i)$ is maintained, if appropriate measures are taken to prevent the next electronic ticket $T_{i,j+1}$ from being provided to the terminal apparatus 20.

Further, in an example of the above-described exemplary embodiment, immediately after the decryption of the first key $X_{i,j}$ with the electronic ticket $T_{i,j}$ and the decryption of the encrypted confidential file $e(K_i, F_i)$ with the common key $K_i$ resulting from the decryption of the first key $X_{i,j}$, the first key $X_{i,j}$ is updated to the first key $X_{i,j+1}$, and the common key $K_i$ is deleted from the terminal apparatus 20. This example minimizes the period in which all information necessary for decrypting the encrypted confidential file $e(K_i, F_i)$ is present in the terminal apparatus 20, i.e., the period in which the encrypted confidential file $e(K_i, F_i)$ is exposed to the risk of leakage.

The above description has been given of the method in which, every time the confidential file $F_i$ is used on the terminal apparatus 20 with the electronic ticket $T_{i,j}$, the electronic ticket $T_{i,j}$ is discarded, and the first key $X_{i,j}$ is updated to the first key $X_{i,j+1}$. According to this method, the terminal apparatus 20 needs to acquire a new electronic ticket $T_{i,j}$ from the management apparatus 10 for each use of the confidential file $F_i$. It is conceivable, as another example, to employ a method of reusing the electronic ticket $T_{i,j}$ and the first key $X_{i,j}$ during the validity period of the electronic ticket $T_{i,j}$, without discarding the electronic ticket $T_{i,j}$ and the first key $X_{i,j}$ from the terminal apparatus 20 immediately after the end of the use of the confidential file $F_i$. In this method, the discard of the electronic ticket $T_{i,j}$ and the update of the first key $X_{i,j}$ to the first key $X_{i,j+1}$ take place upon expiration of the electronic ticket $T_{i,j}$. According to the method, all information allowing the decryption of the encrypted confidential file $e(K_i, F_i)$ is present in the terminal apparatus 20 during the validity period of the electronic ticket $T_{i,j}$ acquired by the terminal apparatus 20. Therefore, the present example is inferior to the foregoing exemplary embodiment in terms of information security. According to the present example, however, the encrypted confidential file $e(K_i, F_i)$ in the terminal apparatus 20 is safely protected during the time from the expiration of the electronic ticket $T_{i,j}$ to the acquisition of the next electronic ticket $T_{i,j+1}$. Further, the terminal apparatus 20 is not required to acquire the electronic ticket $T_{i,j}$ from the management apparatus 10 for each use of the confidential file $F_i$. Accordingly, a troublesome operation is reduced, and the time taken to display the confidential file $F_i$ is reduced by the time taken to acquire the electronic ticket $T_{i,j}$.

Further, in the above-described example, the shared random number $R_i$ shared by the management apparatus 10 and the terminal apparatus 20 is updated with the one-way function HF shared thereby. However, the update using such a common function is a mere example. The required condition is that the same shared random number $R_i$ is shared by the management apparatus 10 and the terminal apparatus 20, and that the shared random number $R_i$ is updated to the next value $R_{i+1}$ practically unpredictable from the value $R_i$ every time the use of the shared random number $R_i$ (i.e., the decryption of the second key $Y_i$) ends. Therefore, any other method may be employed to update the shared random number $R_i$, if the method satisfies the above-described condition. For example, similarly as in an example described in Japanese Unexamined Patent Application Publication No. 2012-156809, a method may be employed in which the management apparatus 10 previously creates and provides a sequence of shared random numbers to the terminal apparatus 20, and the management apparatus 10 and the terminal apparatus 20 sequentially and synchronously select new shared random numbers from the sequence.

Further, the above-described example uses the common key (symmetric key) cryptosystem that uses the same common key for the encryption and decryption of the confidential file $F_i$. However, this cryptosystem is not mandatory, and the asymmetric key cryptosystem may be employed. If the asymmetric cryptosystem is used, the file providing unit 14 of the management apparatus 10 generates the second key $Y_i$ by doubly encrypting a decryption key corresponding to an encryption key used to encrypt the confidential file $F_i$, by using the shared random number $R_i$ and a first key encryption key $r_{i,1}$ for the confidential file $F_i$, and provides the second key $Y_i$ to the terminal apparatus 20. The first key $X_{i,j}$ stored in the terminal apparatus 20 corresponds to the decryption key encrypted with the key encryption key $r_{i,j}$. When the asymmetric cryptosystem is used, therefore, the "common key $K_i$" used in the processing of the above-described exemplary embodiment may be understood as the "decryption key $K_i$." Just for confirmation, if the common key cryptosystem is used to encrypt the confidential file $F_i$, the encryption key used to encrypt the confidential file $F_i$ and the decryption key corresponding to the encryption key (i.e., the decryption key used to decrypt the encrypted confidential file $e(K_i, F_i)$) have the same value (i.e., the common key $K_i$).

Further, in the above-described example, the second key $Y_i$ is obtained by first performing the first encryption of the common key (decryption key) $K_i$ with the key encryption key $r_{i,j}$, and thereafter further performing the second encryption of the first key $X_{i,j}$ resulting from the first encryption with the shared random number $R_i$. However, this order of encryptions is not mandatory. Alternatively, the second key $Y_i$ may be obtained by first encrypting the common key (decryption key) $K_i$ with the shared random number $R_i$ and further encrypting the encryption result with the key encryption key $r_{i,j}$. In this case, the terminal apparatus 20 decrypts the second key $Y_i$ with the shared random number $R_i$ and the first key decryption key $d_{i,1}$ included in the first electronic ticket $T_{i,1}$ corresponding to the confidential file $F_i$, to thereby regenerate the common key (decryption key) $K_i$. Then, the terminal apparatus 20 decrypts the encrypted confidential file $e(K_i, F_i)$ with the common key $K_i$, and thereafter encrypts the common key $K_i$ with the second key encryption key $r_{i,2}$ included in the first electronic ticket $T_{i,1}$, to thereby obtain a first key $X_{i,2}$. The terminal apparatus 20 then stores the first key $X_{i,2}$ in the view management database 29 in preparation for the use of the next electronic ticket $T_{i,2}$. Processing following the acquisition of the second electronic ticket $T_{i,2}$ by the terminal apparatus 20 is similar to that of the above-described example.

The management apparatus 10 and the terminal apparatus 20 described above are realized by causing, for example, a general-purpose computer to execute a program describing the processing of the above-described functional modules. Herein, the computer includes, as hardware, a circuit configuration in which a microprocessor such as a central processing unit (CPU), a memory (first memory) such as a random access memory (RAM) and a read only memory (ROM), a second memory such as a hard disk drive (HDD), a solid state drive (SSD), and a flash memory, various input/output (I/O) interfaces, and a network interface that performs a control for connection with a network such as a local area network, for example, are connected via a bus, for example. The bus may be connected, via the I/O interfaces, for example, to a disc drive for data reading and/or writing on portable disc recording media such as a compact disc (CD) and a digital versatile disc (DVD), a memory reader/writer for data reading and/or writing on portable nonvolatile recording media of various standards such as a flash memory, and so forth. The program describing the processing content of the functional modules exemplified above is stored in the second memory via a recording medium such as a CD or a DVD or via a communication unit such as a network, and is installed in the computer. The program stored in the second memory is read onto the RAM and executed by the microprocessor such as the CPU, to thereby realize the group of functional modules exemplified above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information providing system comprising a first apparatus and a second apparatus, the first apparatus including:
   (A) a first memory configured to store an i-th shared random number $R_i$ and shared information for updating the shared random number $R_i$ to an (i+1)-th shared random number $R_{i+1}$, which are shared by the first apparatus and the second apparatus, wherin i represents an integer granter than or equal to 1; and
   at least one first processor which implements:
   (B) a providing unit configured to provide encrypted information $e(K_i, F_i)$ and an encrypted key $Y_i$ to the second apparatus, the encrypted information $e(K_i, F_i)$ obtained by encrypting provision target information $F_i$, which is to be provided in the i-th place to the second apparatus from the first apparatus, with an encryption key corresponding to the provision target information $F_i$, and the encrypted key $Y_i$ obtained by encrypting a decryption key $K_i$ corresponding to the encryption key with the shared random number $R_i$; and
   (C) a shared random number updating unit configured to update the shared random number $R_i$ stored in the first memory to the (i+1)-th shared random number $R_{i+1}$ in accordance with the shared information after the encrypted key $Y_i$ is obtained by encrypting the decryption key $K_i$ with the shared random number $R_i$, to thereby generate the (i+1)-th shared random number $R_{i+1}$, and
   the second apparatus including:
   (a) a second memory configured to store the shared random number $R_i$ and the shared information; and
   at least one second processor which implements:
   (b) an encrypted information acquiring unit configured to acquire the encrypted information $e(K_i, F_i)$ and the encrypted key $Y_i$ corresponding to the i-th provision target information $F_i$, which are provided from the first apparatus;
   (c) an encrypted key decrypting unit configured to decrypt the encrypted key $Y_i$ acquired by the encrypted information acquiring unit with the shared random number $R_i$ to thereby calculate the decryption key $K_i$, and updates the shared random number $R_i$ stored in the second memory to the (i+1)-th shared random number $R_{i+1}$ in accordance with the shared information after the use of the shared random number $R_i$ to calculate the decryption key $K_i$, to thereby generate the (i+1)-th shared random number $R_{i+1}$, and
   (d) an information decrypting unit configured to decrypt the encrypted information $e(K_i, F_i)$ into the provision target information $F_i$ with the calculated decryption key $K_i$,
   wherein the encrypted key $Y_i$ provided to the second apparatus by the providing unit of the first apparatus is obtained by doubly encrypting the decryption key $K_i$ corresponding to the encryption key with the shared random number $R_i$ and a first key encryption key $r_{i,1}$ for the provision target information $F_i$.

2. The information providing system according to claim 1, wherein the at least one first processor further implements:
   (D) an issuing unit configured to issue j-th view control information $T_{i,j}$, which includes a j-th key decryption key $d_{i,j}$ corresponding to a j-th key encryption key $r_{i,j}$ and a (j+1)-th key encryption key $r_{i,j+1}$, to the second apparatus for the provision target information $F_i$, wherein j represents an integer greater than or equal to 1, and
   wherein the encrypted key decrypting unit of the second apparatus is further configured to decrypt the encrypted key $Y_i$ with the shared random number $R_i$ and a first key decryption key $d_{i,1}$ included in view control information $T_{i,1}$ acquired first for the provision target information $F_i$, to thereby calculate the decryption key $K_i$, and
   wherein the second apparatus further includes:
   (e) a first key memory that stores a first key $X_{i,j}$ corresponding to the provision target information $F_i$, and
   wherein the at least one second processor further implements:
   (f) a view control information acquiring unit configured to acquire the j-th view control information $T_{i,j}$ issued for the provision target information $F_i$ from the first apparatus;
   (g) a first key decrypting unit configured to decrypt the first key $X_{i,j}$ stored in the first key memory with the j-th key decryption key $d_{i,j}$ included in the acquired view control information $T_{i,j}$, to thereby calculate the decryption key $K_i$; and
   (h) a first key updating unit configured to encrypt the decryption key $K_i$ with the (j+1)-th key encryption key $r_{i,j+1}$ included in the j-th view control information $T_{i,j}$ after the encrypted information $e(K_i, F_i)$ is decrypted with the decryption key $K_i$ decrypted with the j-th key decryption key $d_{i,j}$ included in the j-th view control information $T_{i,j}$, to thereby generate a next first key $X_{i,j+1}$, and updates the first key $X_{i,j}$ corresponding to the provision target information $F_i$ stored in the first key memory to the generated next first key $X_{i,j+1}$.

3. The information providing system according to claim 1, wherein, after the encrypted key decrypting unit of the second apparatus updates the shared random number $R_i$ stored in the second memory to the (i+1)-th shared random number $R_{i+1}$, the shared random number $R_i$ is deleted from the second memory.

4. The information providing system according to claim 2, wherein, after the encrypted key decrypting unit of the second apparatus updates the shared random number $R_i$ stored in the second memory to the (i+1)-th shared random number $R_{i+1}$, the shared random number $R_i$ is deleted from the second memory.

5. The information providing system according to claim 2, wherein, after the first key updating unit of the second apparatus updates the first key $X_{i,j}$ stored in the first key memory to the next first key $X_{i,j+1}$, the first key $X_{i,j}$ is deleted from the first key memory.

6. An information processing apparatus comprising:
(A) a memory configured to store an i-th shared random number $R_i$ and shared information for updating the shared random number $R_i$ to an (i+1)-th shared random number $R_{i+1}$, which are shared by the information processing apparatus and an external apparatus, wherein i represents an integer greater than or equal to 1; and
at lest one first processor which implements:
(B) a providing unit configured to provide encrypted information $e(K_i, F_i)$ and an encrypted key $Y_i$ to the external apparatus, the encrypted information $e(K_i, F_i)$ obtained by encrypting provision target information $F_i$, which is to be provided in the i-th place to the external apparatus from the information processing apparatus, with an encryption key corresponding to the provision target information $F_i$, and the encrypted key $Y_i$ obtained by encrypting a decryption key $K_i$ corresponding to the encryption key with the shared random number $R_i$; and
(C) a shared random number updating unit configured to update the shared random number $R_i$ stored in the memory to the (i+1)-th shared random number $R_{i+1}$ in accordance with the shared information after the encrypted key $Y_i$ is obtained by encrypting the decryption key $K_i$ with the shared random number $R_i$, to thereby generate the (i+1)-th shared random number $R_{i+1}$,
wherin the encrypted key $Y_i$ provided to the external apparatus by the providing unit of the information processing apparatus is obtained by doubly encrypting the decryption key $K_i$ corresponding to the encryption key with the shared random number $R_i$ and a first key encryption key $r_{i,1}$ for the provision target information $F_i$.

7. A non-transitory computer readable medium storing a program causing a computer to execute a process for information processing, the process comprising:
(A) storing an i-th shared random number $R_i$ and shared information for updating the shared random number $R_i$ to an (i+1)-th shared random number $R_{i+1}$, which are shared by the computer and an external apparatus, wherein i represents an integer greater than or equal to 1;
(B) providing encrypted information $e(K_i, F_i)$ and an encrypted key $Y_i$ to the external apparatus, the encrypted information $e(K_i, F_i)$ obtained by encrypting provision target information $F_i$, which is to be provided in the i-th place to the external apparatus from the computer, with an encryption key corresponding to the provision target information $F_i$, and the encrypted key $Y_i$ obtained by encrypting a decryption key $K_i$ corresponding to the encryption key with the shared random number $R_i$; and
(C) updating the stored shared random number $R_i$ to the (i+1)-th shared random number $R_{i+1}$ in accordance with the shared information after the encrypted key $Y_i$ is obtained by encrypting the decryption key $K_i$ with the shared random number $R_i$, to thereby generate the (i+1)-th shared random number $R_{i+1}$,
wherein the encrypted key $Y_i$ provided to the external apparatus by the computer is obtained by doubly encrypting the decryption key $K_i$ corresponding to the encryption key with the shared random number $R_i$ and a first key encryption key $r_{i,1}$ for the provision target information $F_i$.

8. An information processing apparatus comprising:
(a) a memory configured to store an i-th shared random number $R_i$ and shared information for updating the shared random number $R_i$ to an (i+1)-th shared random number $R_{i+1}$, which are shared by the information processing apparatus and an external apparatus; wherein i represents an integer greater than or equal to 1; and
at least one first processor which implements:
(b) an encrypted information acquiring unit configured to acquire encrypted information $e(K_i, F_i)$ and an encrypted key $Y_i$ from the external apparatus, the encrypted information $e(K_i, F_i)$ obtained by encrypting i-th provision target information $F_i$ with an encryption key corresponding to the provision target information $F_i$, and the encrypted key $Y_i$ obtained by doubly encrypting a decryption key $K_i$ corresponding to the encryption key with the shared random number $R_i$ and a first key encryption key $r_{i,1}$ for the provision target information $F_i$;
(c) an encrypted key decrypting unit configured to decrypt the encrypted key $Y_i$ acquired by the encrypted information acquiring unit with the shared random number $R_i$ to thereby calculate the decryption key $K_i$, and updates the shared random number $R_i$ stored in the memory to the (i+1)-th shared random number $R_{i+1}$ in accordance with the shared information after the use of the shared random number $R_i$ to calculate the decryption key $K_i$, to thereby generate the (i+1)-th shared random number $R_{i+i}$; and
(d) an information decrypting unit configured to decrypt the encrypted information $e(K_i, F_i)$ into the provision target information $F_i$ with the calculated decryption key $K_i$.

9. A non-transitory computer readable medium storing a program causing a computer to execute a process for information processing, the process comprising:
(a) storing an i-th shared random number $R_i$ and shared information for updating the shared random number $R_i$ to an (i+1)-th shared random number $R_{i+1}$, which are shared by the computer and an external apparatus, wherein i represents an integer greater than or equal to 1;
(b) acquiring encrypted information $e(K_i, F_i)$ and an encrypted key $Y_i$ from the external apparatus, the encrypted information $e(K_i, F_i)$ obtained by encrypting i-th provision target information $F_i$ with an encryption key corresponding to the provision target information $F_i$, and the encrypted key $Y_i$ obtained by doubly encrypting a decryption key $K_i$ corresponding to the encryption key with the shared random number $R_i$ and a first key encryption key $r_{i,1}$ for the provision target information $F_i$;

(c) decrypting the acquired encrypted key $Y_i$ with the shared random number $R_i$ to thereby calculate the decryption key $K_i$, and updating the stored shared random number $R_i$ to the (i+1)-th shared random number $R_{i+1}$ in accordance with the shared information after the use of the shared random number $R_i$ to calculate the decryption key $K_i$, to thereby generate the (i+1)-th shared random number $R_{i+1}$; and (d) decrypting the encrypted information $e(K_i, F_i)$ into the provision target information $F_i$ with the calculated decryption key $K_i$.

10. An information providing method of providing information from a first apparatus to a second apparatus, the information providing method comprising:

storing an i-th shared random number $R_i$ and shared information for updating the shared random number $R_i$ to an (i+1)-th shared random number $R_{i+1}$ in the first apparatus, wherein i represents an integer greater than or equal to 1;

storing the shared random number $R_i$ and the shared information in the second apparatus;

providing encrypted information $e(K_i, F_i)$ and an encrypted key $Y_i$ to the second apparatus from the first apparatus, the encrypted information $e(K_i, F_i)$ obtained by encrypting provision target information $F_i$, which is to be provided in the i-th place to the second apparatus from the first apparatus, with an encryption key corresponding to the provision target information $F_i$, and the encrypted key $Y_i$ obtained by doubly encrypting a decryption key $K_i$ corresponding to the encryption key with the shared random number $R_i$ and a first key encryption key $r_{i,1}$ for the provision target information $F_i$;

updating the shared random number $R_i$ stored in the first apparatus to the (i+1)-th shared random number $R_{i+1}$ in accordance with the shared information after the encrypted key $Y_i$ is obtained by encrypting the decryption key $K_i$ with the shared random number $R_i$, to thereby generate the (i+1)-th shared random number $R_{i+1}$;

decrypting the provided encrypted key $Y_i$ with the shared random number $R_i$ to calculate the decryption key $K_i$, and updating the shared random number $R_i$ stored in the second apparatus to the (i+1)-th shared random number $R_{i+1}$ in accordance with the shared information after the use of the shared random number $R_i$ to calculate the decryption key $K_i$, to thereby generate the (i+1)-th shared random number $R_{i+1}$; and decrypting the encrypted information $e(K_i, F_i)$ into the provision target information $F_i$ with the calculated decryption key $K_i$.

* * * * *